(12) United States Patent
Eisenach

(10) Patent No.: US 12,155,457 B2
(45) Date of Patent: Nov. 26, 2024

(54) OPTICAL MULTIPLEXER SUPPORTING MULTIPLE CHANNEL SIZES

(71) Applicant: Nokia Solutions and Networks Oy, Espoo (FI)

(72) Inventor: Randy Eisenach, Richardson, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 157 days.

(21) Appl. No.: 17/960,087

(22) Filed: Oct. 4, 2022

(65) Prior Publication Data

US 2024/0113800 A1 Apr. 4, 2024

(51) Int. Cl.
*H04J 14/02* (2006.01)
(52) U.S. Cl.
CPC ................. *H04J 14/0227* (2013.01)
(58) Field of Classification Search
None
See application file for complete search history.

(56) References Cited

U.S. PATENT DOCUMENTS

| | | | |
|---|---|---|---|
| 6,904,240 B1 * | 6/2005 | Suga | H04J 14/02 398/79 |
| 7,236,704 B1 * | 6/2007 | Cao | G02B 6/29383 398/83 |
| 9,124,958 B2 | 9/2015 | Coroy | |
| 10,461,880 B2 * | 10/2019 | Boertjes | H04Q 11/0066 |
| 2004/0161234 A1 * | 8/2004 | Ozawa | H04B 10/077 398/33 |
| 2004/0252996 A1 | 12/2004 | McNicol | |
| 2006/0153497 A1 * | 7/2006 | Jander | H04B 10/532 385/11 |
| 2013/0315591 A1 * | 11/2013 | Inoue | H04J 14/0209 398/48 |

(Continued)

FOREIGN PATENT DOCUMENTS

KR 20150139696 A 12/2015

OTHER PUBLICATIONS

European Search Report; Application 23200011.7; Mar. 6, 2024.

(Continued)

*Primary Examiner* — Pranesh K Barua
(74) *Attorney, Agent, or Firm* — Duft & Bornsen, PC

(57) ABSTRACT

An apparatus includes an optical wavelength multiplexer to multiplex a sequence of optical wavelength channels. The optical wavelength multiplexer comprises a first passive optical filter to combine odd channels of the sequence of optical wavelength channels into a first multiplexed optical signal, a second passive optical filter to combine even channels of the sequence of optical wavelength channels into a second multiplexed optical signal, and an optical combiner to combine the odd channels and the even channels into a composite optical signal. The optical wavelength multiplexer comprises variable optical attenuators, and an electronic controller to operate the variable optical attenuators to substantially block one or more adjacent optical wavelength channels adjacent to a particular optical wavelength channel provisioned to the optical wavelength multiplexer in response to a width for the particular optical wavelength channel being larger than a width of the adjacent optical wavelength channel(s).

20 Claims, 17 Drawing Sheets

(56) References Cited

U.S. PATENT DOCUMENTS

| | | | | |
|---|---|---|---|---|
| 2013/0315598 | A1* | 11/2013 | Marom | H04J 14/0224 |
| | | | | 398/79 |
| 2014/0334814 | A1* | 11/2014 | Ji | H04B 10/07953 |
| | | | | 398/34 |
| 2016/0087747 | A1* | 3/2016 | Way | H04B 10/541 |
| | | | | 398/81 |
| 2016/0352449 | A1 | 12/2016 | Honda | |
| 2017/0078042 | A1* | 3/2017 | Boduch | H04Q 11/0005 |
| 2018/0102865 | A1 | 4/2018 | Li et al. | |
| 2019/0305852 | A1* | 10/2019 | Kato | H04B 10/6166 |
| 2020/0313787 | A1 | 10/2020 | Bravi | |

OTHER PUBLICATIONS

Philip N. Ji et al; Passband Optimisation for Hybrid 40G/100G system Using Tunable Asymmetric Interleaver; ECOC 2021.

400Gbps data transmission achieved over DCI in a 75 Ghz DWDM channel; https://www.electronicsweekly.com/news/business/400gbps-data; Jun. 22, 2020.

Evolution to flexible grid WDM; https://www.lightwaveonline.com; Nov. 26, 2013.

* cited by examiner

OPTICAL MULTIPLEXER SUPPORTING MULTIPLE CHANNEL SIZES

TECHNICAL FIELD

Various example embodiments relate to the field of optical communications.

BACKGROUND

Wavelength Division Multiplexing (WDM), such as Dense WDM (DWDM), is a technology in fiber-optic communications that uses multiple wavelength channels to send data over the same medium. Light can travel in one fiber over two or more non-overlapping wavelength channels, and several optical signals may be transmitted in an optical fiber utilizing different wavelength channels of the optical spectrum. A WDM system uses an optical multiplexer to combine light of multiple wavelength channels into a composite optical signal, and an optical demultiplexer to separate the composite optical signal into the light of individual wavelength channels. Many conventional optical multiplexers/demultiplexers have a fixed channel size for the wavelength channels, such as 50 GHz, 75 GHz, etc. However, a single, fixed wavelength channel size may be insufficient for some WDM applications.

SUMMARY

Various embodiments provide an optical wavelength multiplexer or optical wavelength multiplexer/demultiplexer that supports multiple channel sizes. As an overview, an optical wavelength multiplexer as described herein uses one or more passive optical filters to multiplex the odd channels into a first multiplexed optical signal, and one or more passive optical filters to multiplex the even channels into a second multiplexed optical signal. The optical wavelength multiplexer uses an optical combiner to combine the multiplexed optical signals output from the passive optical filters into a more dense, composite optical signal comprising the odd channels and the even channels. For example, each passive optical filter may support 32 channels with 150 GHz channel spacing, and combining the multiplexed optical signals from the odd and even optical filters may create 64 channels with 75 GHz channel spacing. The odd and even channels are offset in the frequency domain by one-half of the width of the odd or even channel size. For example, with 150 GHz channel spacing, the center frequencies of the even channels are offset from the odd channels by 75 GHz. When the odd and even channels are combined, the resultant composite optical signal defines one channel size (e.g., a first channel size) for the WDM channels.

To support multiple channel sizes, the optical wavelength multiplexer includes optical attenuators implemented on the WDM channels. A larger channel size (i.e., a second channel size) may be provisioned for one or more of the WDM channels (referred to as target channels) using the optical attenuators. For a target channel, the optical attenuators of adjacent channels substantially block optical signals in the adjacent channels. Blocking optical signals in the adjacent channels prevents interference on a target channel from the adjacent channels. Thus, a larger channel size may be provisioned for the target channel. One technical benefit is the optical wavelength multiplexer may be used in WDM applications where different channel sizes are desired.

In an embodiment, an apparatus comprises an optical wavelength multiplexer to multiplex a sequence of optical wavelength channels. The optical wavelength multiplexer comprises a first passive optical filter configured to combine odd channels of the sequence of optical wavelength channels into a first multiplexed optical signal, a second passive optical filter configured to combine even channels of the sequence of optical wavelength channels into a second multiplexed optical signal, and an optical combiner configured to combine the odd channels and the even channels into a composite optical signal. The optical wavelength multiplexer further comprises a plurality of variable optical attenuators. Each of the variable optical attenuators connected to a corresponding optical input of the optical wavelength multiplexer. The optical wavelength multiplexer further comprises an electronic controller configured to operate the variable optical attenuators to substantially block one or more adjacent optical wavelength channels adjacent to a particular optical wavelength channel provisioned to the optical wavelength multiplexer in response to a width for the particular optical wavelength channel being larger than a width of the one or more adjacent optical wavelength channels.

In an embodiment, the first passive optical filter comprises a first arrayed waveguide grating filter, and the second passive optical filter comprises a second arrayed waveguide grating filter.

In an embodiment, the optical wavelength multiplexer further comprises photodetectors. Each of the photodetectors is configured to measure light at a corresponding one of the optical inputs of the optical wavelength multiplexer.

In an embodiment, the electronic controller is configured to enable the optical wavelength multiplexer to selectively combine light from the optical wavelength channels of different widths.

In an embodiment, the variable optical attenuators are implemented between optical channel input ports of one or both of the first and second passive optical filters. In an embodiment, the electronic controller is configured to set each of the variable optical attenuators at the optical inputs of the one or more adjacent optical wavelength channels to an optical attenuation of greater than 25 dB to substantially block the one or more adjacent optical wavelength channels.

In an embodiment, the particular optical wavelength channel has a width of about 150 GHz, and at least one of the one or more adjacent optical wavelength channels has a width of about 75 GHz.

In an embodiment, the optical wavelength multiplexer is implemented in a Data Center Interconnect (DCI) network.

In an embodiment, an apparatus comprises an optical wavelength multiplexer/demultiplexer configured to operate on a sequence of optical Wavelength Division Multiplexing (WDM) channels. The optical wavelength multiplexer/demultiplexer comprises a first passive optical filter configured to combine odd channels of the sequence into a first multiplexed optical signal, a second passive optical filter configured to combine even channels of the sequence into a second multiplexed optical signal, and an optical combiner configured to combine the odd channels of the first multiplexed optical signal and the even channels of the second multiplexed optical signal into a composite optical signal. The optical wavelength multiplexer/demultiplexer further comprises variable optical attenuators. Each of the variable optical attenuators are implemented near an optical input for a corresponding one of the optical WDM channels. The optical wavelength multiplexer/demultiplexer further comprises an electronic controller configured to, for a selected one of the optical WDM channels, operate the variable optical attenuators of adjacent one or more of the optical WDM channels to substantially block optical signals therein in response to a width of the selected one of the optical WDM channels being larger than a width of the one or more adjacent optical WDM channels.

In an embodiment, the first passive optical filter and the second passive optical filter comprise arrayed waveguide grating filters.

In an embodiment, the optical wavelength multiplexer/demultiplexer further comprises a plurality of photodetectors. Each of the photodetectors are connected to transmit a measurement of an intensity of a corresponding one of the optical WDM channels to the electronic controller.

In an embodiment, the electronic controller is configured to selectively operate the variable optical attenuators to reduce overlaps of the optical WDM channels in response to some of the optical WDM channels being configured to have larger widths than others of the optical WDM channels.

In an embodiment, the optical wavelength multiplexer/demultiplexer further comprises an optical splitter configured to split another composite optical signal, a third passive optical filter configured to separate the other composite optical signal into the odd channels, and a fourth passive optical filter configured to separate the other composite optical signal into the even channels.

In an embodiment, the optical wavelength multiplexer/demultiplexer is implemented on a consolidated platform comprising the first passive optical filter, the second passive optical filter, the optical combiner, the variable optical attenuators, the third passive optical filter, the fourth passive optical filter, and the optical splitter housed in an enclosure.

In an embodiment, the optical wavelength multiplexer/demultiplexer is implemented on a modular platform comprising an optical wavelength multiplexer/demultiplexer module comprising the first passive optical filter, the second passive optical filter, the optical combiner, the third passive optical filter, the fourth passive optical filter, and the optical splitter, and a variable optical attenuator array module comprising an array of the variable optical attenuators.

In an embodiment, the optical wavelength multiplexer/demultiplexer is implemented on a modular platform comprising a first optical wavelength multiplexer/demultiplexer module comprising the first passive optical filter, the third passive optical filter, the optical combiner, and the optical splitter, a second optical wavelength multiplexer/demultiplexer module comprising the second passive optical filter and the fourth passive optical filter, a first variable optical attenuator array module comprising a first array of the variable optical attenuators for the odd channels, and a second variable optical attenuator array module comprising a second array of the variable optical attenuators for the even channels.

In an embodiment, the electronic controller is configured to set each of the variable optical attenuators of the one or more adjacent optical WDM channels to an optical attenuation of greater than 25 dB to substantially block the optical signals in the one or more adjacent optical WDM channels.

In an embodiment, the optical wavelength multiplexer/demultiplexer is implemented in a Data Center Interconnect (DCI) network.

In an embodiment, a method of supporting multiple channel sizes for optical wavelength channels is disclosed. The method comprises combining, at a first passive optical filter, odd channels of the optical wavelength channels into a first multiplexed optical signal. The method further comprises combining, at a second passive optical filter, even channels of the optical wavelength channels into a second multiplexed optical signal. The method further comprises combining, at an optical combiner, the odd channels of the first multiplexed optical signal and the even channels of the second multiplexed optical signal into a composite optical signal. The method further comprises controlling, via an electronic controller, variable optical attenuators to substantially block one or more adjacent optical wavelength channels adjacent to a particular optical wavelength channel provisioned with a width larger than a width of the one or more adjacent optical wavelength channels.

In an embodiment, controlling the variable optical attenuators comprises setting each of the variable optical attenuators of the one or more adjacent optical wavelength channels to an optical attenuation of greater than 25 dB to substantially block the one or more adjacent optical wavelength channels.

In an embodiment, an apparatus comprises an optical wavelength multiplexer to wavelength multiplex a sequence of optical wavelength channels. The optical wavelength multiplexer comprises a means for combining odd channels of the sequence of optical wavelength channels into a first multiplexed optical signal, a means for combining even channels of the sequence of optical wavelength channels into a second multiplexed optical signal, and a means for combining the odd channels and the even channels into a composite optical signal. The optical wavelength multiplexer further comprises a means for optically attenuating an optical wavelength channel at each optical input of the optical wavelength multiplexer. The optical wavelength multiplexer further comprises a means for operating the optical attenuation to substantially block one or more adjacent optical wavelength channels adjacent to a particular optical wavelength channel provisioned to the optical wavelength multiplexer in response to a width for the particular optical wavelength channel being larger than a width of the one or more adjacent optical wavelengths channels.

One or more of the above embodiments may be combined as desired.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the claims. The inventive concepts are not limited to the specific embodiments or examples described below, but are defined by the claims and their equivalents.

In WDM applications, optical signals of multiple optical wavelength channels (also referred to as WDM channels or DWDM channels) are transmitted via a single optical fiber. An optical wavelength channel is a specific optical wavelength band, and optical signals of that optical wavelength channel are sent through an optical fiber substantially centered on the channel's center wavelength. Center optical channel wavelengths are separated by a difference in wavelength, which is referred to as the channel spacing. For example, DWDM supports 4800 GHz of spectrum in the C-band, which can be divided into 64 channels with 75 GHz channel spacing, although different numbers of wavelength channels and channel spacings are possible. Sometimes optical wavelength channels may be combined into an optical fiber, at the transmission end, and may be separated into the different non-overlapping optical wavelength channels at the receiver end.

Figure 1:
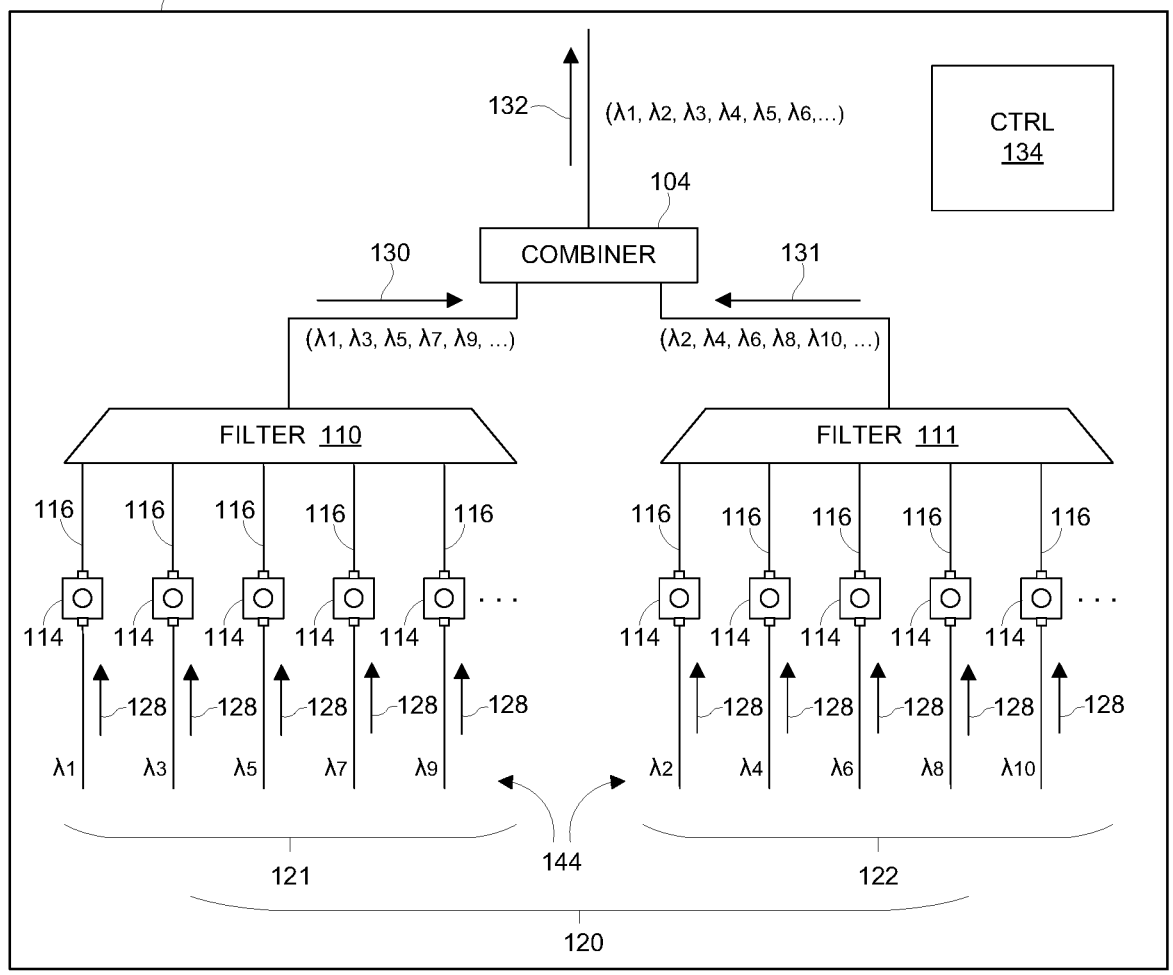
FIG. 1 is a block diagram of an optical wavelength multiplexer in an illustrative embodiment.

FIG. 1 is a block diagram of an optical wavelength multiplexer 100 in an illustrative embodiment. Optical wavelength multiplexer 100 is an electro-optical apparatus configured to multiplex optical signals on different wavelength channels 120, such as in WDM or DWDM applications.

In this embodiment, optical wavelength multiplexer 100 includes a plurality of passive optical filters 110-111, an optical combiner 104, optical attenuators 114, and an electronic controller 134. A passive optical filter is a type of optical device that performs or provides wavelength separation for optical wavelength channels using prisms, bandpass filters, and/or other components that are not powered. A passive optical filter may be configured to combine or multiplex a sequence of optical wavelength channels 120 at different wavelengths into a multiplexed optical signal with a fixed channel spacing in the add (or transmit) direction, and/or to separate a multiplexed optical signal into individual optical wavelength channels 120 in the drop (or receive) direction. In the add direction of FIG. 1, passive optical filter 110 is configured to combine or multiplex the odd channels 121 (e.g., $\lambda_1$, $\lambda_3$, $\lambda_5$, $\lambda_7$, $\lambda_9$, . . . ) into a multiplexed optical signal 130 with a fixed channel spacing. The fixed channel spacing is defined by the construction or design of passive optical filter 110. Passive optical filter 111 is configured to combine or multiplex the even channels 122 (e.g., $\lambda_2$, $\lambda_4$, $\lambda_6$, $\lambda_8$, $\lambda_{10}$, . . . ) into a multiplexed optical signal 131 with a fixed channel spacing. Again, the fixed channel spacing is defined by the construction or design of passive optical filter 111. It may be assumed that the fixed channel spacing is about the same between passive optical filters 110-111. Although passive optical filters 110-111 are shown as operating on odd and even channels 121-122, respectively, it is conceivable that passive optical filters 110-111 may operate on other subsets of the optical wavelength channels 120. Also, although two passive optical filters 110-111 are shown in FIG. 1, optical wavelength multiplexer 100 may include more passive optical filters 110-111 in other embodiments.

An optical combiner 104 (also referred to as an optical coupler) is an optical device configured to combine multiple optical signals onto a composite optical signal (also referred to as a composite WDM signal or composite DWDM signal). For example, optical combiner 104 is configured to combine the multiplexed optical signal 130 comprising the odd channels 121 and the multiplexed optical signal 131 comprising the even channels 122 onto a denser, composite optical signal 132 that comprises the odd channels 121 and the even channels 122. For example, the center frequencies of the even channels 122 may be offset from the center frequencies of the odds channels 121 by one-half the channel width. Although one optical combiner 104 is shown in FIG. 1, optical wavelength multiplexer 100 may include multiple optical combiners 104 in other embodiments.

Figure 2:
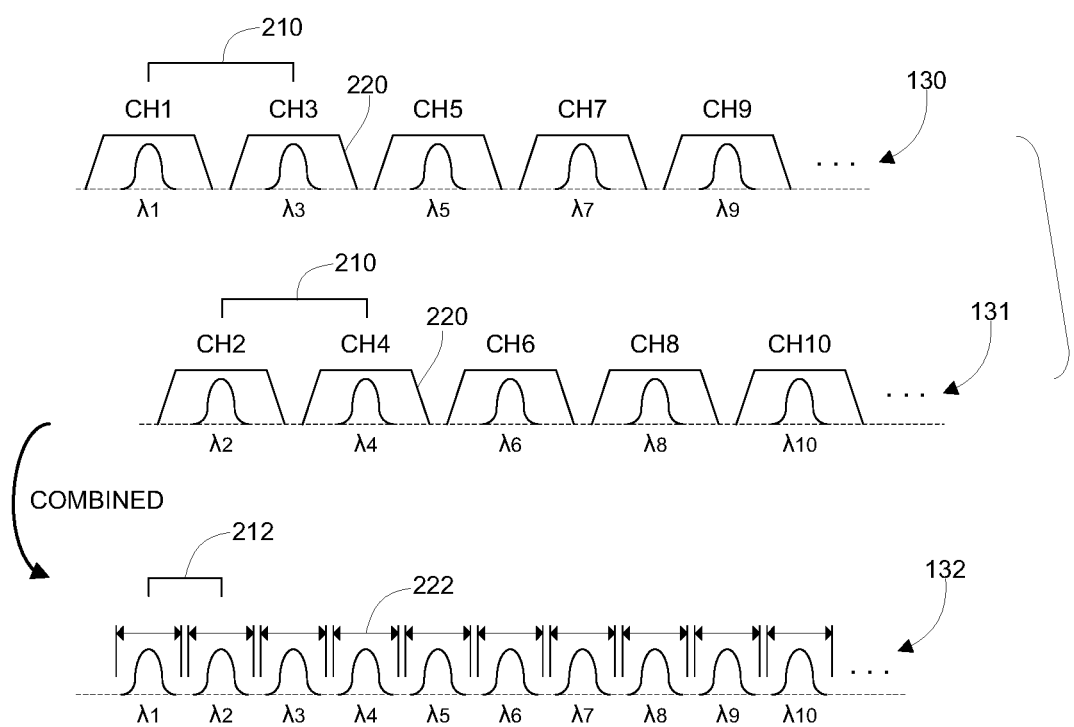
FIG. 2 illustrates optical wavelength channels of multiplexed optical signals and a composite optical signal in an illustrative embodiment.

In the composite optical signal 132, the odd channels 121 and the even channels 122 are offset by about half of the fixed channel spacing. In other words, the channel spacing (also referred to as channel separation) between an odd channel 121 and an even channel 122 is about half of the fixed channel spacing between the odd channels 121 in the multiplexed optical signal 130 and the fixed channel spacing between the even channels 122 in the multiplexed optical signal 131. FIG. 2 illustrates the optical wavelength channels 120 of the multiplexed optical signals 130-131 and the composite optical signal 132 in an illustrative embodiment. Multiplexed optical signal 130, as generated by passive optical filter 110, comprises the odd channels 121 (e.g., CH1, CH3, CH5, etc.) with a fixed channel spacing 210 between consecutive odd channels 121. Multiplexed optical signal 131, as generated by passive optical filter 111, comprises the even channels 122 (e.g., CH2, CH4, CH6, etc.) with a fixed channel spacing 210 between consecutive even channels 122. In one embodiment, the fixed channel spacing 210 may be about 150 GHz, but other channel spacings are considered herein. Composite optical signal 132, as generated by optical combiner 104, comprises the odd channels 121 and the even channels 122 having a smaller channel spacing 212 than the fixed channel spacing 210 (e.g., about half of the fixed channel spacing 210). For example, if the fixed channel spacing is about 150 GHz, then the smaller channel spacing 212 is about 75 GHz.

In addition to channel spacing, the construction or design of passive optical filters 110-111 also defines a channel size or channel width at the passive optical filters 110-111, which may be referred to herein as a filter channel size or filter channel width. An optical carrier signal for an individual optical wavelength channel 120 is defined by its center optical frequency, but the optical bandwidth is spread over a small range of optical frequencies allocated to the optical wavelength channel 120. A passive optical filter 110-111 is configured to filter the wavelength (i.e., center frequency) assigned to the optical wavelength channel 120, and block other optical frequencies outside of the optical wavelength channel 120. The filter channel size therefore comprises a difference between an upper cutoff optical frequency and a lower cutoff optical frequency of an optical wavelength channel 120 at a passive optical filter 110-111. In FIG. 2, passive optical filter 110 and passive optical filter 111 define a filter channel size 220 or filter channel width for optical wavelength channels 120.

When optical combiner 104 combines the odd channels 121 and the even channels 122 to create a denser, composite optical signal 132, the center frequencies of the even channels 122 are offset from the center frequencies of the odds channels 121 by about one-half the channel width, and portions of the optical wavelength channels 120 overlap. Thus, the composite optical signal 132, or overlap of optical wavelength channels 120 on the composite optical signal 132, define a smaller channel size or channel width than the filter channel size 220, which may be referred to herein as the dense channel size or dense channel width. In FIG. 2, composite optical signal 132 defines a dense channel size 222 for optical wavelength channels 120 that is smaller than the filter channel size 220.

In FIG. 1, an optical attenuator 114 is an optical device configured to reduce or weaken the power level of an optical signal. An optical attenuator 114 may comprise a variable optical attenuator (e.g., a step-wise variable or continuously variable), or another type of optical attenuator that has controllable or adjustable optical attenuation. In optical wavelength multiplexer 100, optical attenuators 114 are implemented, disposed, or positioned on optical wavelength channels 120 at optical inputs 144 of optical wavelength multiplexer 100. An optical input 144 of optical wavelength multiplexer 100 includes an optical path 116 configured to carry or guide an optical carrier signal 128 for an optical wavelength channel 120 to a passive optical filter 110-111. Thus, an optical attenuator 114 of an optical wavelength channel 120 may attenuate an optical carrier signal 128 for that optical wavelength channel 120.

Controller 134 comprises circuitry (e.g., digital or analog), logic, hardware, means, etc., configured to control or manage operations of optical wavelength multiplexer 100. Controller 134 may be implemented on one or more processors that execute instructions (i.e., computer readable code) for software that are loaded into memory. The processor, memory, and any algorithms (encoded as instructions, programs, or code) may comprise a means for providing or causing performance or operation of optical wavelength multiplexer 100. Although not specifically illustrated in FIG. 1, controller 134 is electrically coupled to optical attenuators 114 through electrical traces (e.g., copper) or the like, and is configured to provide control signals to optical attenuators 114 to individually control the optical attenuators 114. For example, controller 134 may provide an activate/deactivate control signal, a variable attenuation control signal, or another control signal to an optical attenuator 114. Controller 134 may be configured to enable optical wavelength multiplexer 100 to selectively combine light from optical wavelength channels 120 of different channel widths. Controller 134 may be configured to operate optical attenuators 114 to reduce overlaps of optical wavelength channels 120 in response to some of the optical wavelength channels 120 being configured to have larger channel widths than others.

In one embodiment, controller 134 may comprise an on-board controller (i.e., implemented on the same platform or module as optical wavelength multiplexer 100) as shown in FIG. 1. In one embodiment, controller 134 may comprise an off-board controller (i.e., implemented on a different platform or module than optical wavelength multiplexer 100), such as a shelf controller, that is configured to connect to optical wavelength multiplexer 100.

Figure 3:
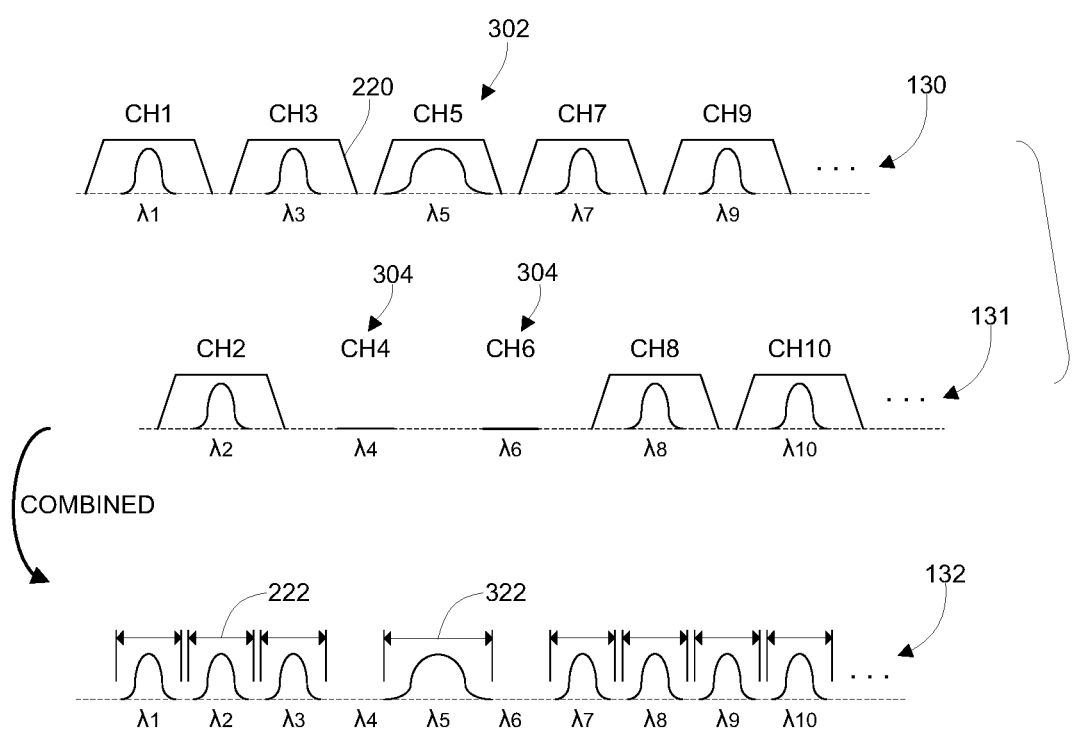
FIG. 3 illustrates a larger channel size for a target channel in an illustrative embodiment.

Optical wavelength multiplexer 100 as described above is configured to support multiple (e.g., two) channels sizes or channel widths for optical wavelength channels 120. As shown in FIG. 2, optical wavelength multiplexer 100 supports the dense channel size 222 for optical wavelength channels 120, and is also configured to support a larger channel size than the dense channel size 222. FIG. 3 illustrates a larger channel size for a target channel in an illustrative embodiment. Assume for this example that the target channel 302 is channel 5 (CH5). To create or provision a larger channel size for the target channel 302, optical attenuators 114 of adjacent channels 304 may be activated or adjusted to block optical signals of the adjacent channels 304, and reduce the power level of the optical signals to substantially zero (if existing). An adjacent channel 304 comprises an optical wavelength channel immediately adjacent or neighboring the target channel 302 on either side. For example, the adjacent channels 304 of the target channel 302 are channel 4 (CH4) and channel 6 (CH6). With optical signals of the adjacent channels 304 canceled, the channel size 322 or channel width of the target channel 302 may be increased without interference. For example, the channel size 322 of the target channel 302 may comprise the filter channel size 220, or may comprise a size between the dense channel size 222 and the filter channel size 220. The larger channel size 322 may be provisioned for other target channels 302 as described above. Other remaining optical wavelength channels 120 may operate using the dense channel size 222. One technical benefit is a different channel size or channel width may be provisioned per optical wavelength channel 120 in optical wavelength multiplexer 100.

FIGS. 4-8 are block diagrams of optical wavelength multiplexer 100 showing additional structure in illustrative embodiments.

Figure 4:
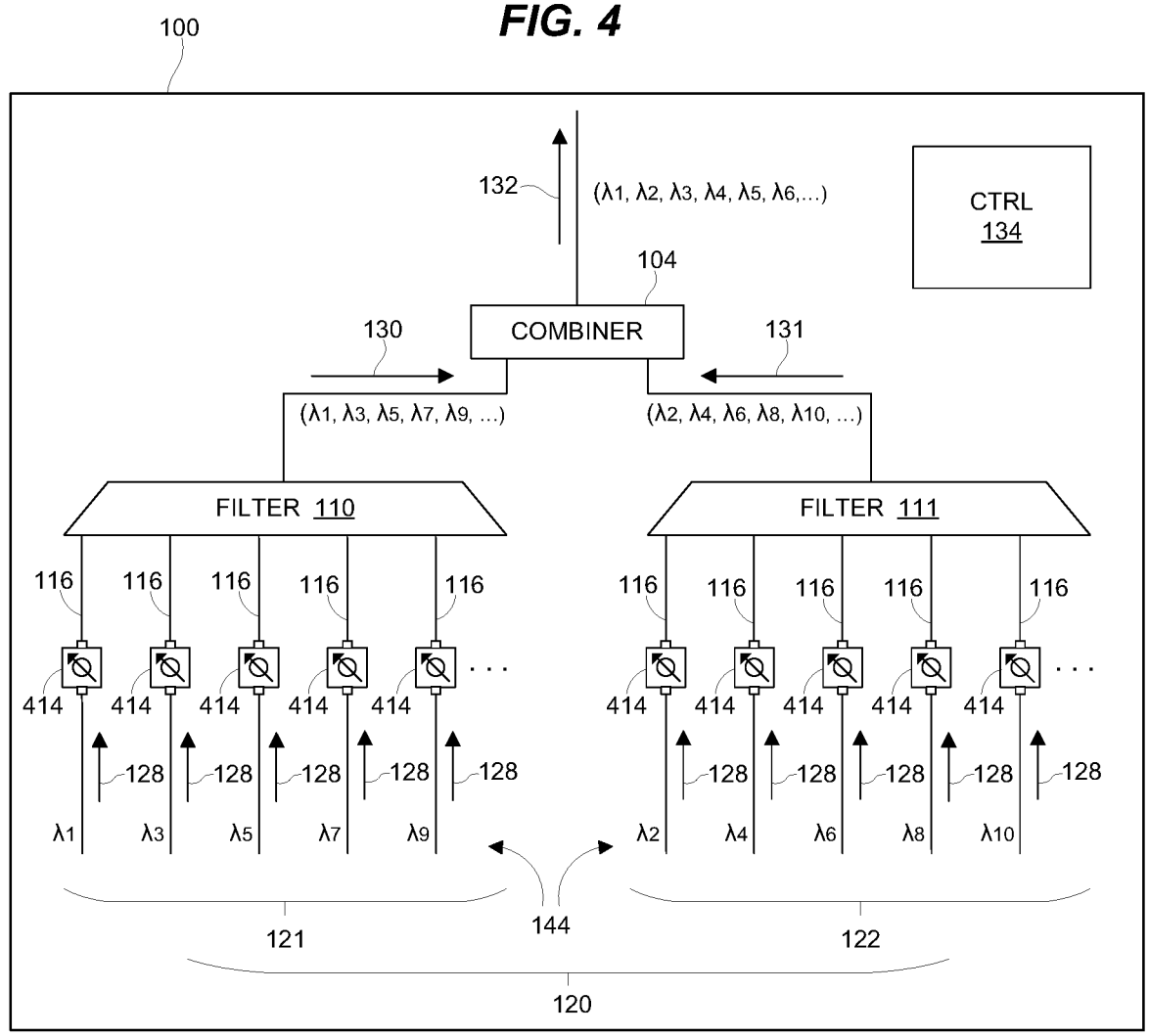
FIG. 4 is a block diagram of an optical wavelength multiplexer with VOAs in an illustrative embodiment.

In FIG. 4, optical attenuators 114 may comprise Variable Optical Attenuators (VOAs) 414, which is a type of optical attenuator configured to vary attenuation based on an electrical signal. VOAs 414 of adjacent channels 304 may be adjusted or set to substantially full or maximum attenuation to block optical signals of the adjacent channels 304 as discussed above. In one embodiment, substantially full or maximum attenuation may comprise optical attenuation greater than about 25 dB, greater than about 35 dB, etc.

Figure 5:
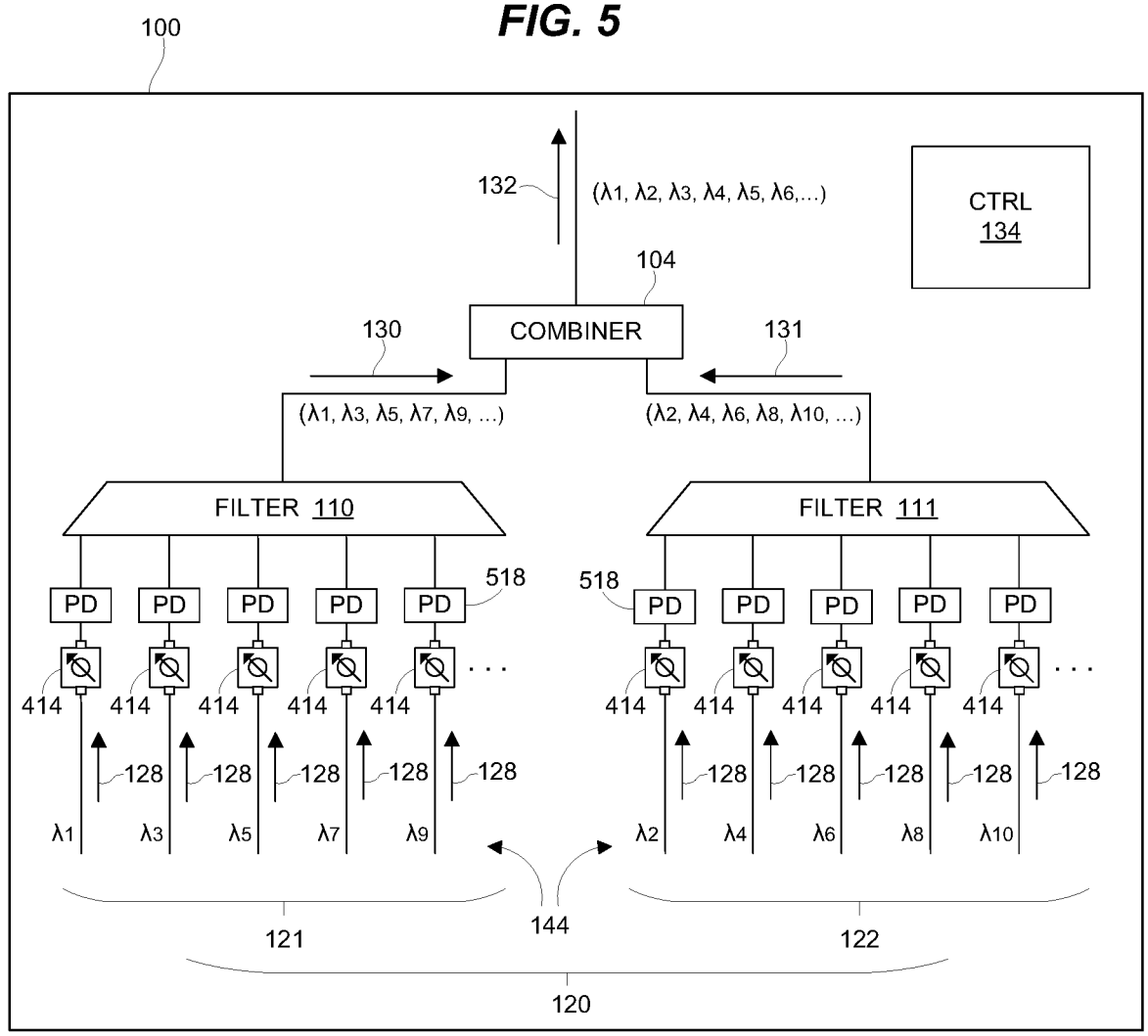
FIG. 5 is a block diagram of an optical wavelength multiplexer with photodetectors (PD) in an illustrative embodiment.

In FIG. 5, optical wavelength multiplexer 100 may further include a plurality of photodetectors (PD) 518. A photodetector 518 is a device or sensor circuit that measures light by converting light intensity into an electrical signal. For example, photodetector 518 may include one or more photodiodes that convert light intensity into an electrical current, and optionally a transimpedance amplifier (TIA) that converts the electrical current output of the one or more photodiodes into voltage output. Photodetectors 518 are connected to transmit a measurement of an intensity of an optical wavelength channel 120 to another component, such as controller 134. In optical wavelength multiplexer 100, a photodetector 518 may be implemented, disposed, or positioned at optical inputs 144 of optical wavelength multiplexer 100 (e.g., on an optical path 116 (see FIG. 1) between an optical attenuator 114 (or VOA 414) and a passive optical filter 110-111 for an optical wavelength channel 120). Photodetectors 518 may be used to measure optical power on adjacent channels 304 to ensure that optical power is being blocked by optical attenuators 114 (or VOAs 414). Also, VOAs 414 and photodetectors 518 in combination may also be used to perform power balancing among the optical wavelength channels 120.

Figure 6:
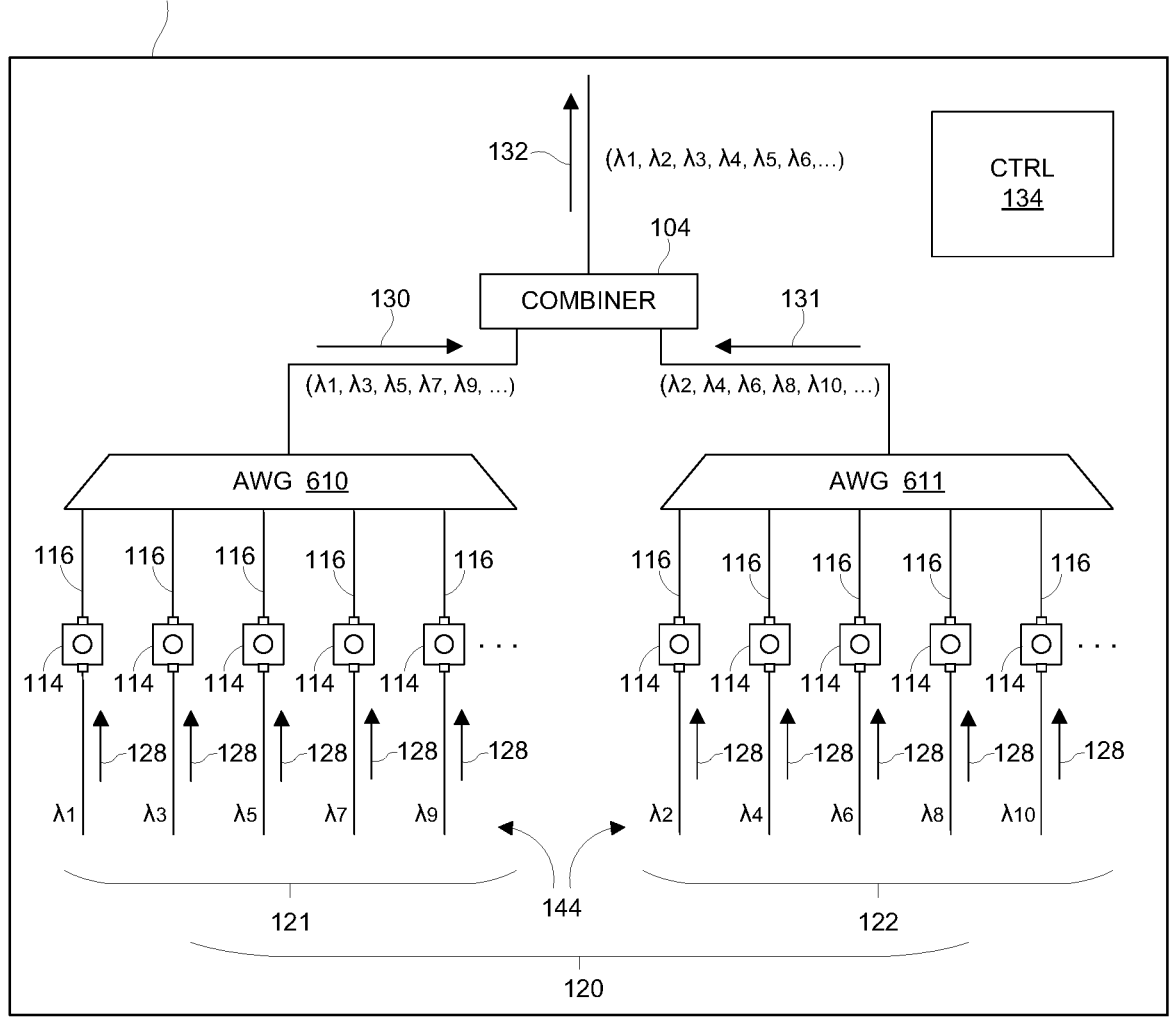
FIG. 6 is a block diagram of an optical wavelength multiplexer with arrayed waveguide grating (AWG) filters in an illustrative embodiment.

In FIG. 6, passive optical filters 110-111 may comprise arrayed waveguide grating (AWG) filters 610-611. An AWG filter 610-611 is a type of passive multiplexer that combines optical signals of different wavelengths into a multiplexed optical signal. In one embodiment, AWG filter 610 may be configured to combine odd channels 121, and AWG filter 611 may be configured to combine even channels 122 as discussed above.

Figure 7:
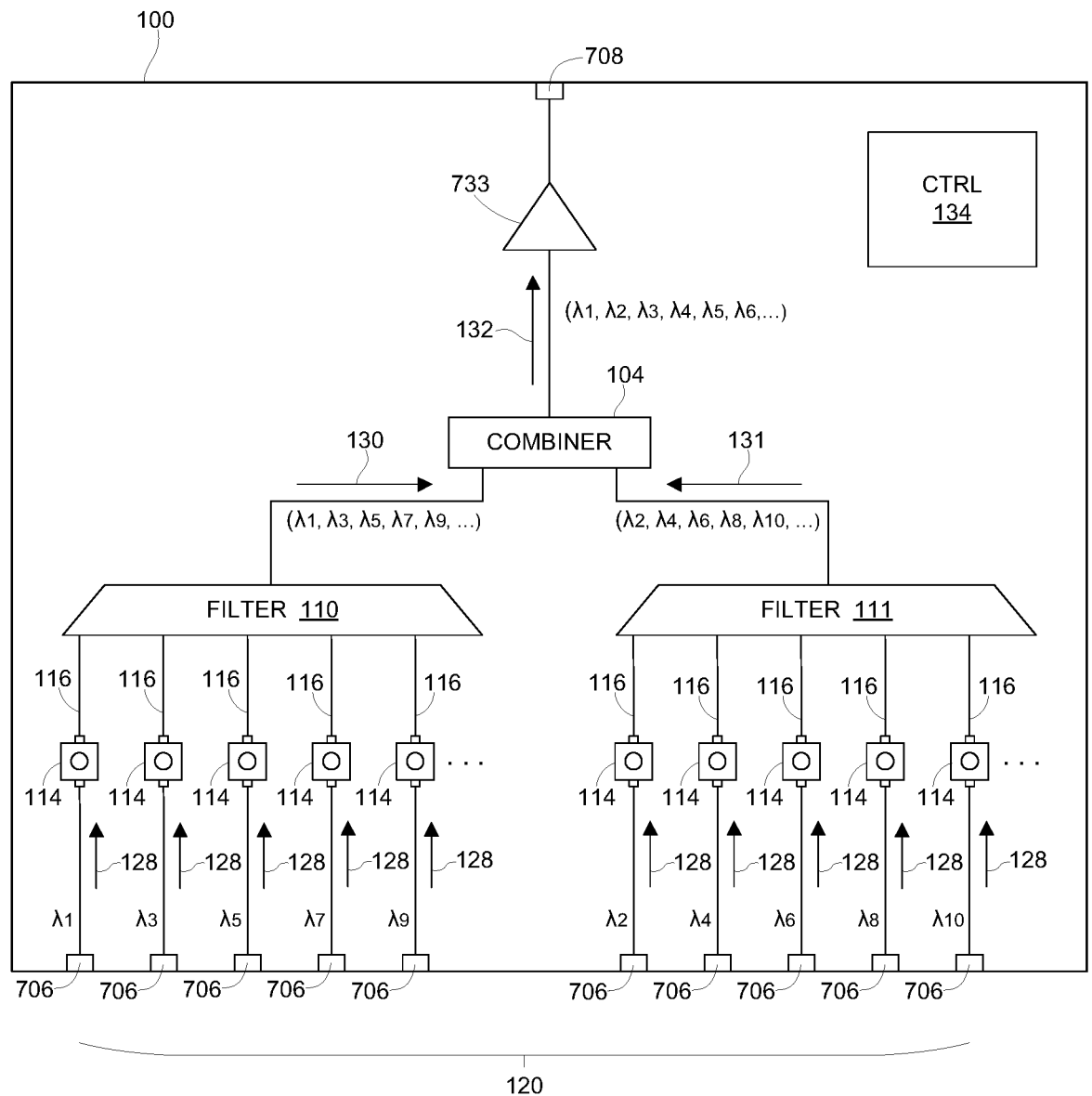
FIG. 7 is a block diagram of an optical wavelength multiplexer with optical channel input ports and an output line port in an illustrative embodiment.

In FIG. 7, optical wavelength multiplexer 100 may further include a plurality of optical channel input ports 706 and an output line port 708. An optical channel input port 706 (also referred to as a client input port) is a port configured to receive or input an optical carrier signal of a specific wavelength corresponding with an optical wavelength channel 120. An optical channel input port 706 is associated with a specific optical wavelength channel 120. An output line port 708 is a port configured to output a composite optical signal 132 to an optical fiber.

Optical wavelength multiplexer 100 may further include one or more optical amplifiers 733 disposed or implemented between optical combiner 104 and output line port 708. Optical amplifier 733 is configured to at least partially compensate for optical insertion losses of passive optical filters 110-111, optical combiner 104, etc. For example, optical amplifier 733 may comprise a type of Optical Fiber Amplifier (OFA), such as an Erbium-Doped Fiber Amplifier (EDFA), a Fiber Raman Amplifier (FRA), or another type of amplifier.

Figure 8:
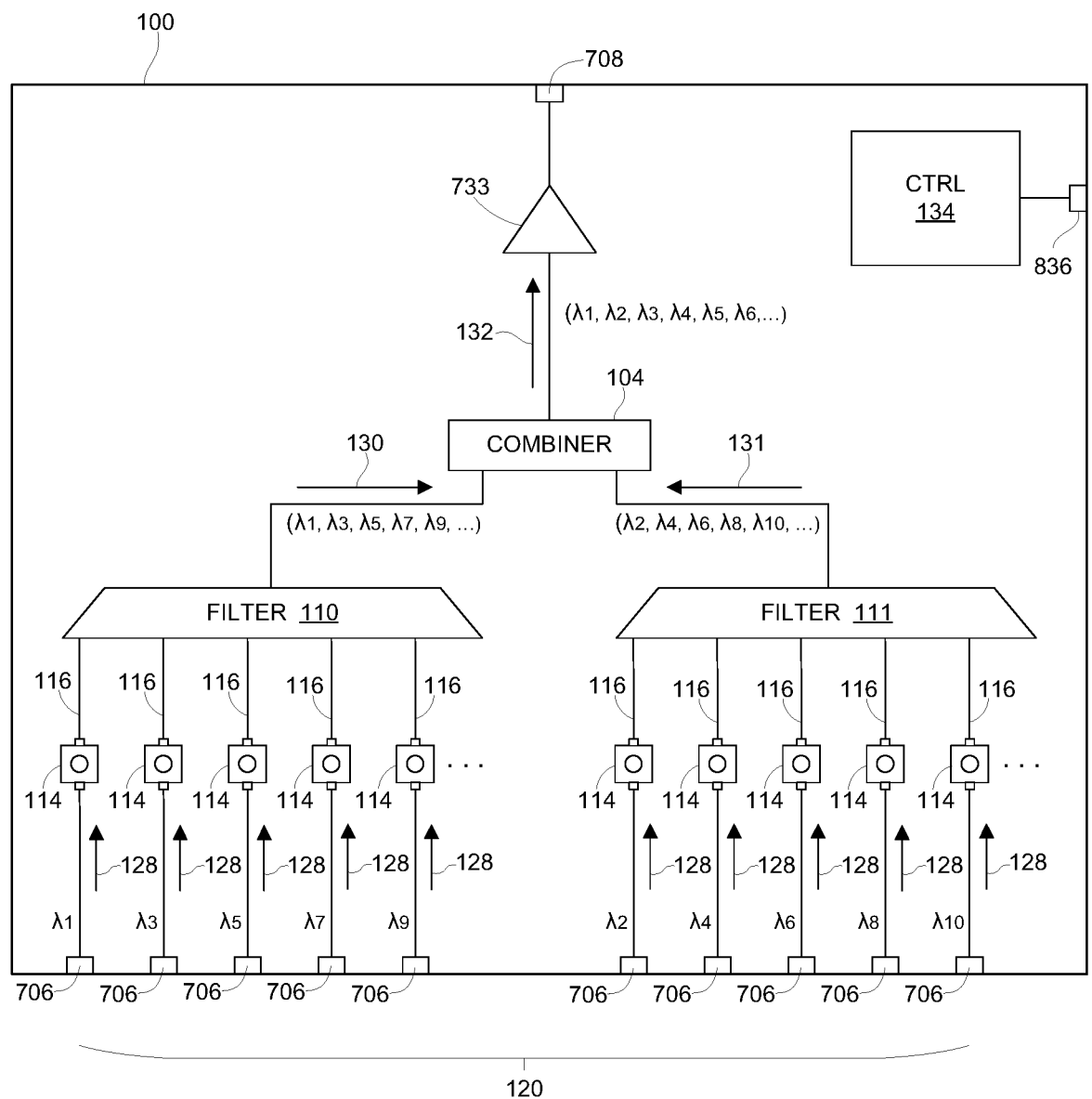
FIG. 8 is a block diagram of an optical wavelength multiplexer with an electrical connector in an illustrative embodiment.

In FIG. 8, optical wavelength multiplexer 100 may further include one or more electrical connectors 836 electrically coupled to controller 134. Electrical connectors 836 are configured to receive data, instructions, etc., that are supplied to controller 134.

Any combinations of the above structures or other structures may be implemented for optical wavelength multiplexer 100.

Figure 9:
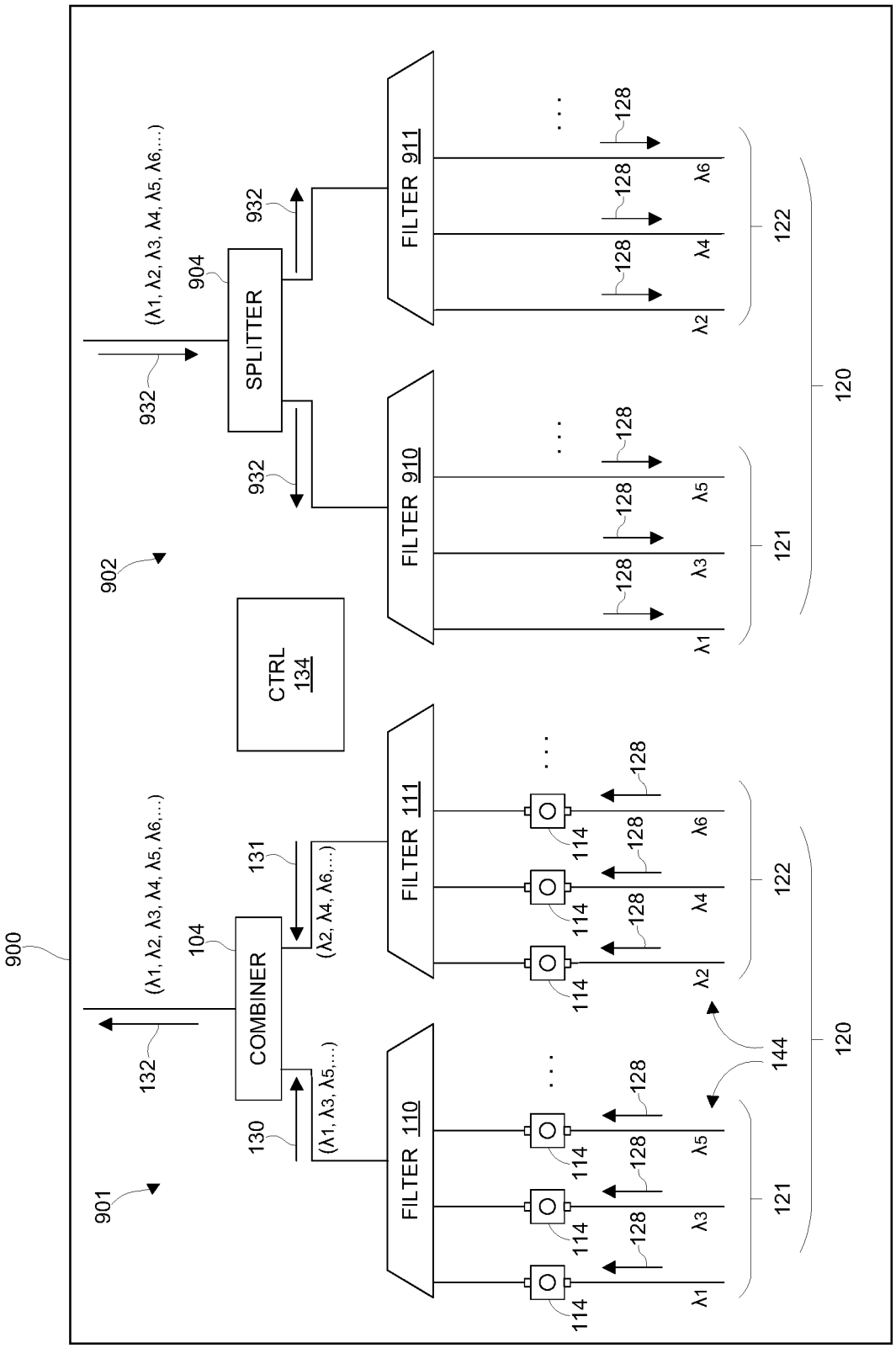
FIG. 9 is a block diagram of an optical wavelength multiplexer/demultiplexer in an illustrative embodiment.

A similar structure of optical wavelength multiplexer 100 as described above may be implemented in an optical wavelength multiplexer/demultiplexer (also referred to as an optical add/drop device). FIG. 9 is a block diagram of an optical wavelength multiplexer/demultiplexer 900 in an illustrative embodiment. Optical wavelength multiplexer/demultiplexer 900 includes add (e.g., multiplexing) components 901 and drop (e.g., demultiplexing) components 902. The add components 901 include components as described above for optical wavelength multiplexer 100. The drop components 902 include an optical splitter 904 and a plurality of passive optical filters 910-911. An optical splitter 904 is an optical device configured to split or divide optical power into two or more optical paths. For example, optical splitter 904 is configured to split the optical power of a composite optical signal 932, which comprises both the odd channels 121 and the even channels 122, into multiple composite optical signals 932 comprising the odd channels 121 and the even channels 122.

Passive optical filter 910 is configured to separate the composite optical signal 932 into the individual odd channels 121 (e.g., $\lambda_1, \lambda_3, \lambda_5, \ldots$), and passive optical filter 911 is configured to separate the composite optical signal 932 into the individual even channels 122 (e.g., $\lambda_2, \lambda_4, \lambda_6, \ldots$). Although passive optical filters 910-911 are shown as operating on odd and even channels 121-122, respectively, it is conceivable that passive optical filters 910-911 may operate on other subsets of the optical wavelength channels 120. Also, although two passive optical filters 910-911 are shown in FIG. 9, optical wavelength multiplexer/demultiplexer 900 may include more passive optical filters 910-911 in other embodiments.

Optical wavelength multiplexer/demultiplexer 900 include one or more electronic controllers 134. A controller 134 comprises circuitry (e.g., digital or analog), logic, hardware, means, etc., configured to control or manage operations of optical wavelength multiplexer/demultiplexer 900. In one embodiment, controller 134 may comprise an on-board controller (i.e., implemented on the same platform or module as optical wavelength multiplexer/demultiplexer 900) as shown in FIG. 9. In one embodiment, controller 134 may comprise an off-board controller (i.e., implemented on a different platform or module than optical wavelength multiplexer/demultiplexer 900), such as a shelf controller, that is configured to connect to optical wavelength multiplexer/demultiplexer 900.

Figure 10:
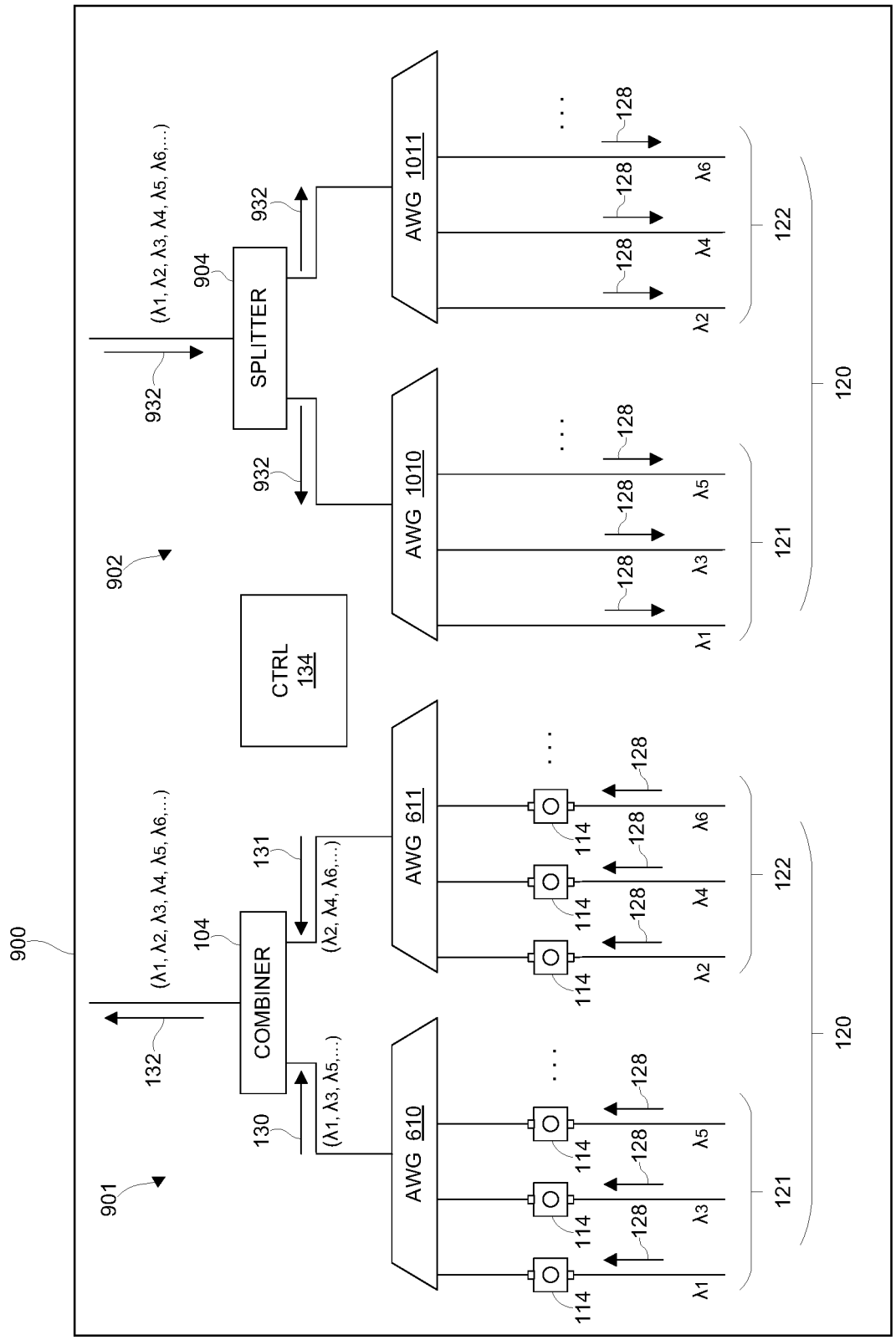
FIG. 10 is a block diagram of an optical wavelength multiplexer/demultiplexer with arrayed waveguide grating (AWG) filters in an illustrative embodiment.
Figure 11:
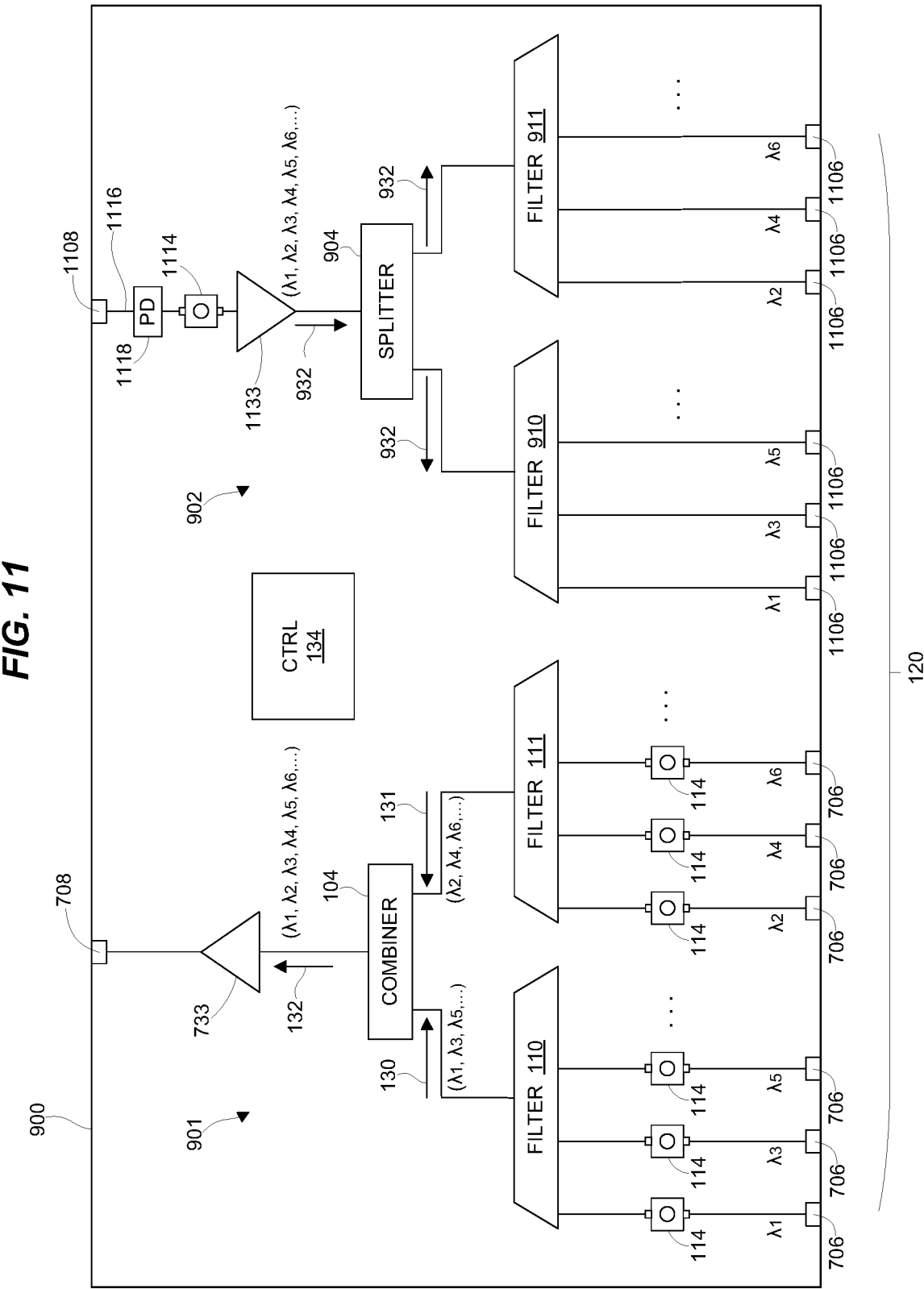
FIG. 11 is a block diagram of an optical wavelength multiplexer/demultiplexer with optical channel input ports and an output line port on the add side, and optical channel output ports and an input line port on the drop side in an illustrative embodiment.
Figure 12:
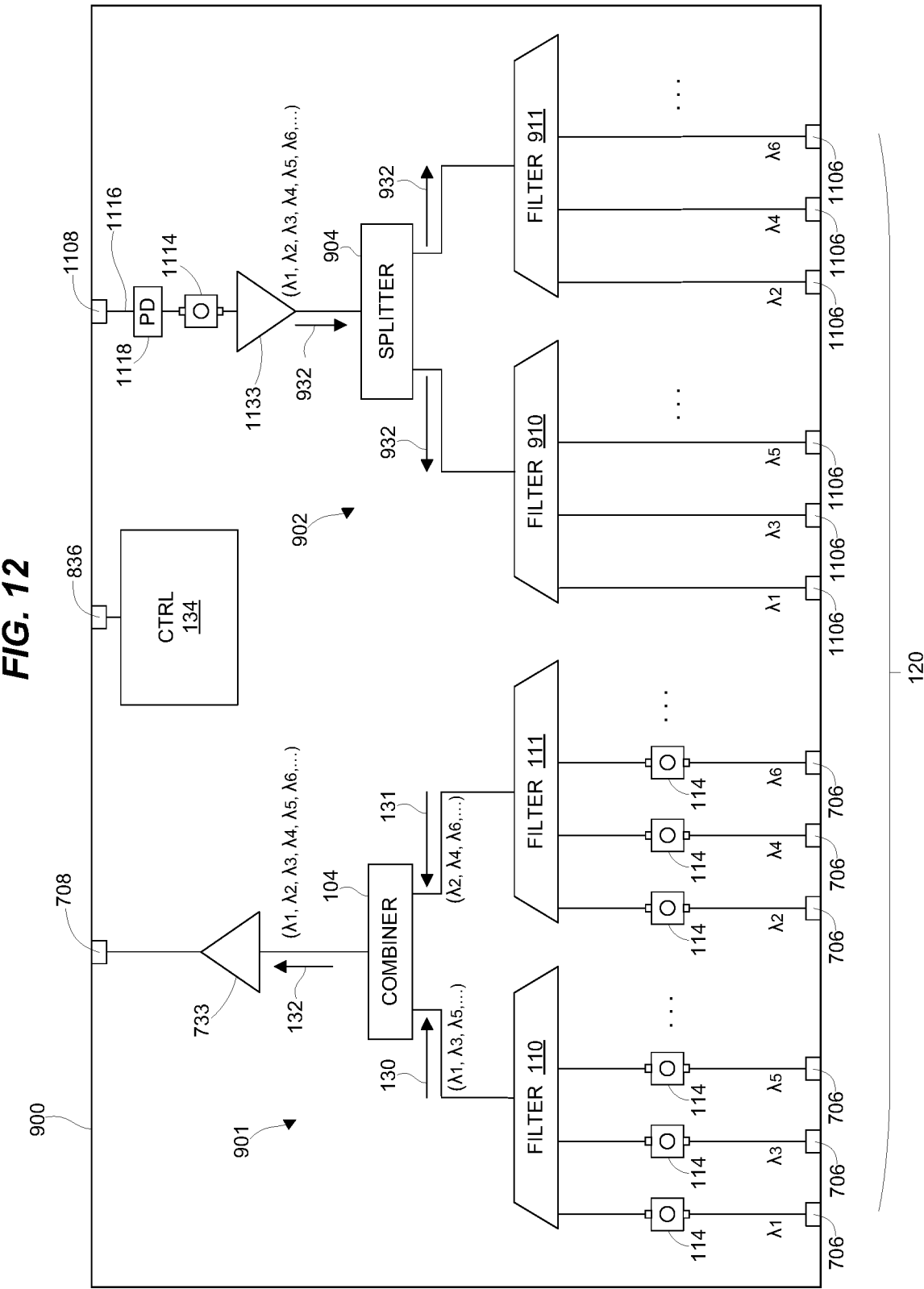
FIG. 12 is a block diagram of an optical wavelength multiplexer/demultiplexer with an electrical connector in an illustrative embodiment.

FIGS. 10-12 are block diagrams of optical wavelength multiplexer/demultiplexer 900 showing additional structure in illustrative embodiments. In FIG. 10, passive optical filters 110-111 may comprise AWG filters 610-611, and/or passive optical filters 910-911 may comprise AWG filters 1010-1011. In one embodiment, AWG filter 1010 may be configured to separate odd channels 121, and AWG filter 1011 may be configured to separate even channels 122 as discussed above.

In FIG. 11, optical wavelength multiplexer/demultiplexer 900 may further include a plurality of optical channel input ports 706 and an output line port 708 on the add side. On the drop side, optical wavelength multiplexer/demultiplexer 900 may further include a plurality of optical channel output ports 1106 and an input line port 1108. An optical channel output port 1106 is associated with an optical wavelength channel 120, and is configured to output an optical carrier signal 128 of a specific channel wavelength. An input line port 1108 is a port configured to input a composite optical signal 932 from an optical fiber.

The drop components 902 of optical wavelength multiplexer/demultiplexer 900 may further include one or more optical amplifiers 1133. For example, optical amplifier 1133 may comprise a type of OFA, such as an EDFA, an FRA, or another type of amplifier. The drop components 902 may further include one or more optical attenuators 1114 and one or more photodetectors (PD) 1118. Optical attenuator 1114 and photodetector 1118 are implemented, disposed, or positioned an optical path 1116 or optical waveguide to optical amplifier 1133. Optical path 1116 is configured to carry or guide a composite optical signal 932 comprising a plurality of optical wavelength channels 120. Optical attenuator 1114 is configured to attenuate the composite optical signal 932 to meet input requirements of optical amplifier 1133 based on output from photodetector 1118.

In FIG. 12, optical wavelength multiplexer/demultiplexer 900 may further include one or more electrical connectors 836 electrically coupled to controller 134. Electrical connectors 836 are configured to receive data, instructions, etc., that are supplied to controller 134. Although not specifically illustrated in FIG. 12, controller 134 is electrically coupled to optical attenuators 114/1114 through electrical traces (e.g., copper) or the like, and is configured to provide control signals to optical attenuators 114/1114. Controller 134 may also be electrically coupled to other components, such as photodetectors 518/1118.

Any combinations of the above structures or other structures may be implemented for optical wavelength multiplexer/demultiplexer 900.

Figure 13:
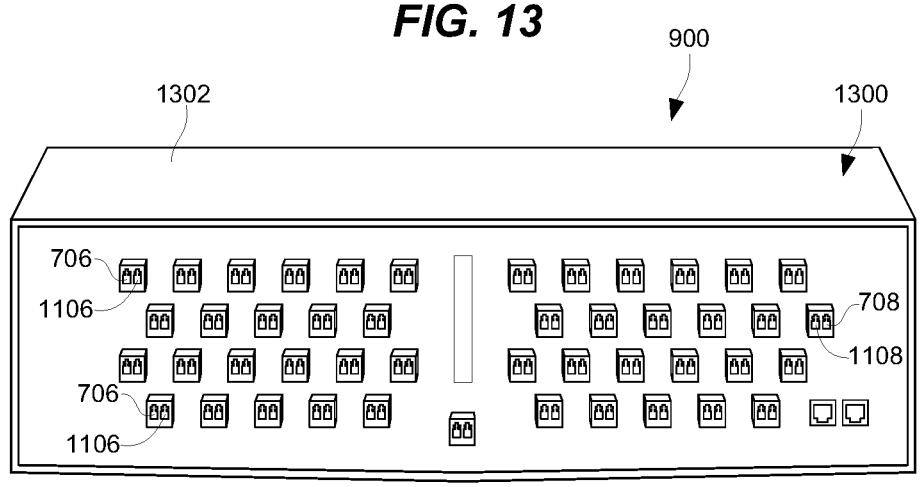
FIG. 13 is a perspective view of an optical wavelength multiplexer/demultiplexer on a consolidated platform in an illustrative embodiment.

In one embodiment, the components of optical wavelength multiplexer/demultiplexer 900 may be combined or integrated into a single unit or consolidated platform. FIG. 13 is a perspective view of optical wavelength multiplexer/demultiplexer 900 on a consolidated platform 1300 in an illustrative embodiment. Optical wavelength multiplexer/demultiplexer 900 includes an enclosure 1302 that houses its components (see, for example, FIGS. 11-12). Visible on a side or face of enclosure 1302 are optical channel input ports 706 and optical channel output ports 1106 for a plurality of optical wavelength channels 120, an input line port 1108, and an output line port 708. Optical wavelength multiplexer/demultiplexer 900 may have other configurations, as one example is shown in FIG. 13.

Figure 14:
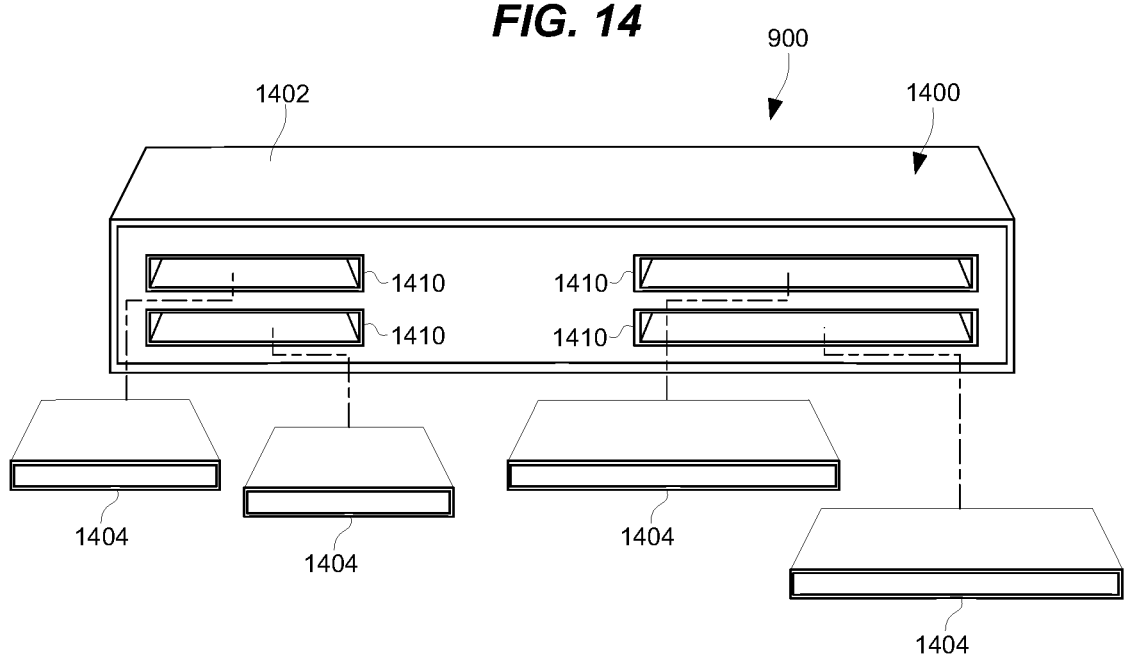
FIG. 14 is a perspective view of an optical wavelength multiplexer/demultiplexer on a modular platform in another illustrative embodiment.

In one embodiment, at least some of the components of optical wavelength multiplexer/demultiplexer 900 may comprise pluggable modules. FIG. 14 is a perspective view of optical wavelength multiplexer/demultiplexer 900 on a modular platform 1400 in another illustrative embodiment. In this embodiment, modular platform 1400 may include a base unit 1402, and one or more pluggable modules 1404. Base unit 1402 includes one or more modular slots 1410, a power supply (not visible), one or more on-board controllers (not visible), etc. Pluggable modules 1404 are configured to connect in a modular slot 1410 of base unit 1402. Examples of pluggable modules for optical wavelength multiplexer/demultiplexer 900 are illustrated in FIGS. 15-16.

Figure 15:
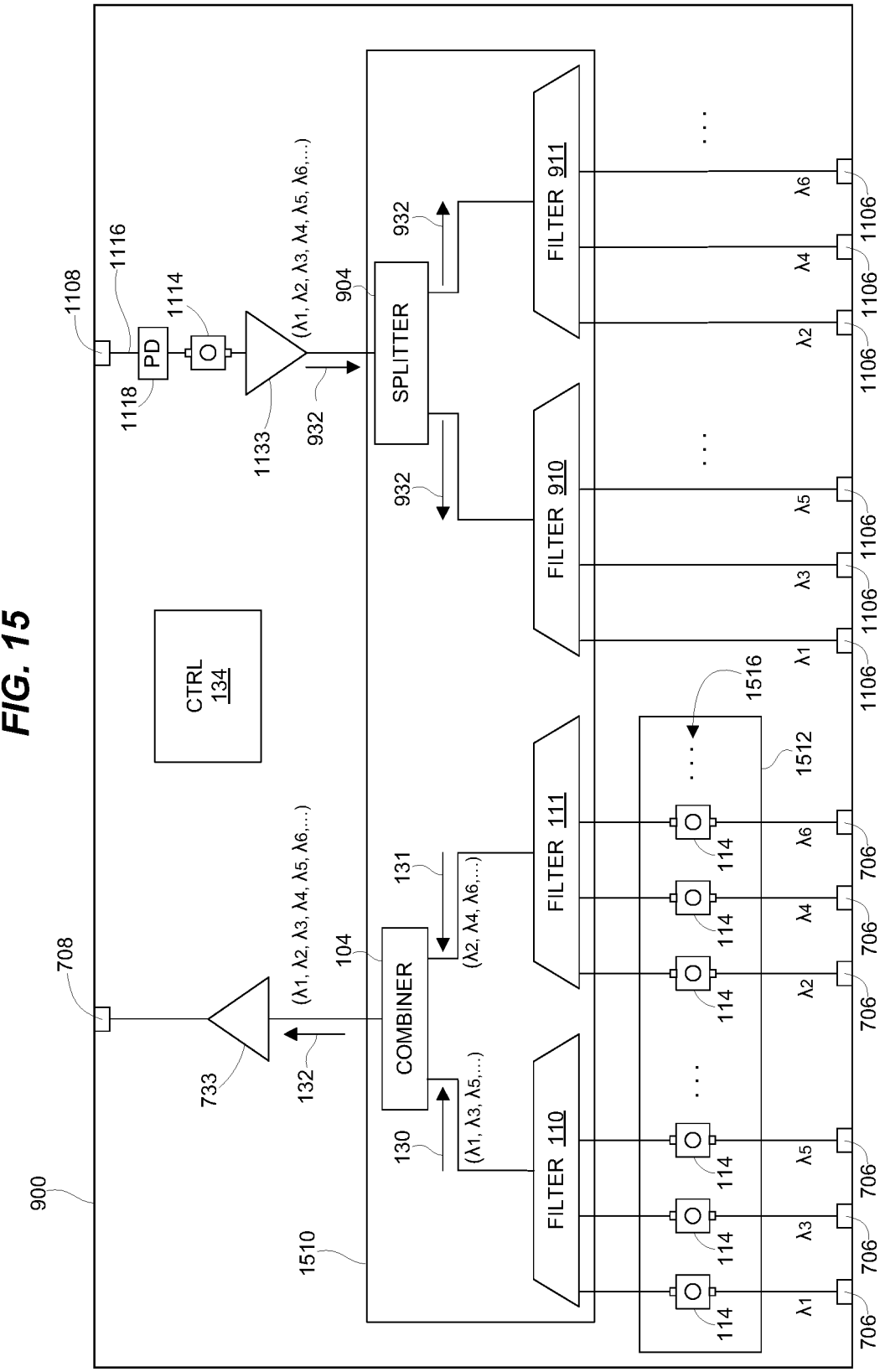
FIG. 15 is a perspective view of an optical wavelength multiplexer/demultiplexer with an optical multiplexer/demultiplexer module for odd channels and even channels, and an optical attenuator array module on a modular platform in another illustrative embodiment.

In FIG. 15, optical wavelength multiplexer/demultiplexer 900 includes an optical multiplexer/demultiplexer module 1510 for the odd channels 121 and the even channels 122, and an optical attenuator array module 1512. An optical multiplexer/demultiplexer module 1510 comprises add optical filters 110-111 for the odd channels 121 and the even channels 122, and drop optical filters 910-911 for the odd channels 121 and the even channels 122. Optical multiplexer/demultiplexer module 1510 may also include optical combiner 104 and optical splitter 904 as shown in FIG. 15, but these components may be on a separate module in other embodiments. Optical attenuator array module 1512 includes an array 1516 of optical attenuators 114 (e.g., VOAs) for the odd channels 121 and the even channels 122. Other components of optical wavelength multiplexer/demultiplexer 900 may be implemented on a separate module or integrated in the optical multiplexer/demultiplexer module 1510, such as optical amplifiers 733/1133.

Figure 16:
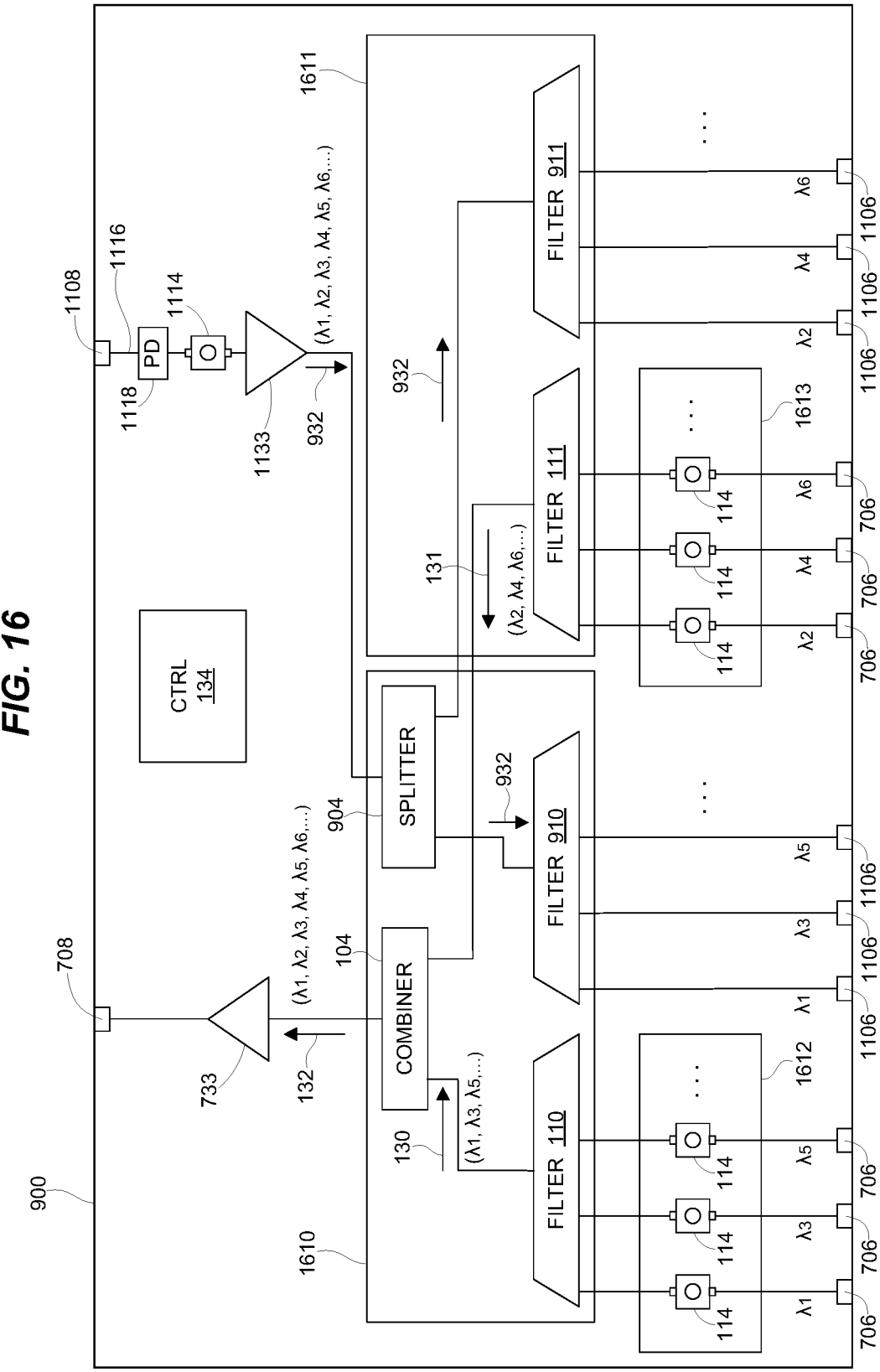
FIG. 16 is a perspective view of an optical wavelength multiplexer/demultiplexer with an optical multiplexer/demultiplexer module for odd channels, an optical multiplexer/demultiplexer module for even channels, an optical attenuator array module for odd channels, and an optical attenuator array module for even channels in another illustrative embodiment.

In FIG. 16, optical wavelength multiplexer/demultiplexer 900 includes an optical multiplexer/demultiplexer module 1610 for the odd channels 121, an optical multiplexer/demultiplexer module 1611 for the even channels 122, an optical attenuator array module 1612 for the odd channels 121, and an optical attenuator array module 1613 for the even channels 122. Optical multiplexer/demultiplexer module 1610 includes an add optical filter 110 and a drop optical filter 910 for the odd channels 121. Optical multiplexer/demultiplexer module 1611 includes an add optical filter 111 and a drop optical filter 911 for the even channels 122. Optical multiplexer/demultiplexer module 1610 may also include optical combiner 104 and optical splitter 904 as shown in FIG. 16, but these components may be on a separate module or on optical multiplexer/demultiplexer module 1611 in other embodiments. Optical attenuator array module 1612 includes an array of optical attenuators 114 (e.g., VOAs) for the odd channels 121. Optical attenuator array module 1613 includes an array of optical attenuators 114 (e.g., VOAs) for the even channels 122. Other components of optical wavelength multiplexer/demultiplexer 900 may be implemented on a separate module or integrated another module.

Other modular configurations are considered herein for optical wavelength multiplexer/demultiplexer 900.

Figure 17:
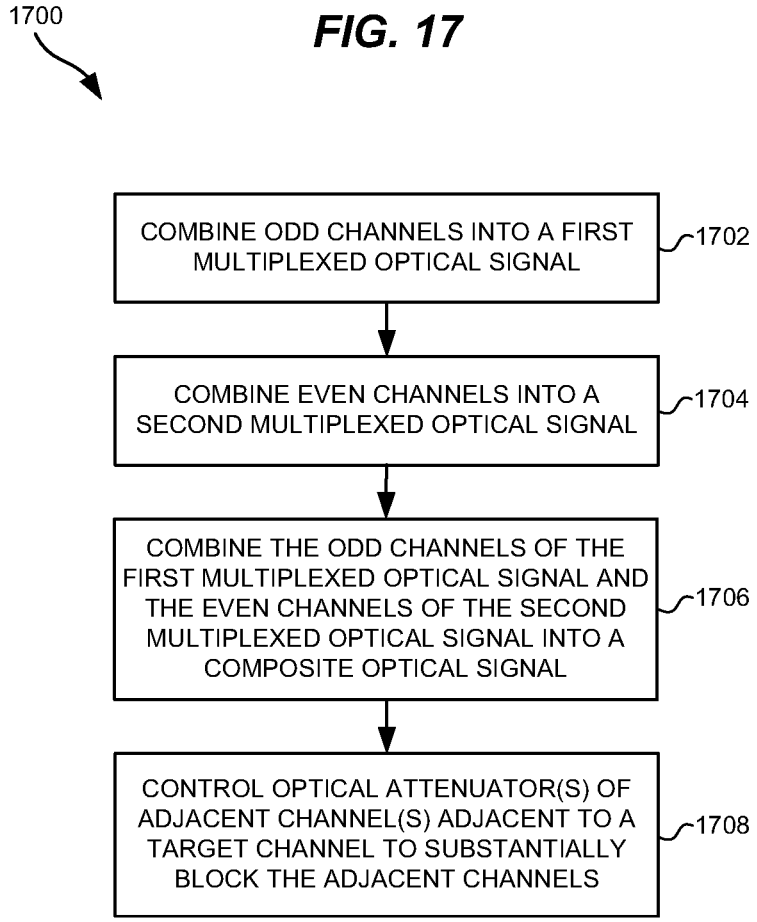
FIG. 17 is a flow chart illustrating a method of supporting multiple channel sizes for optical wavelength channels in an illustrative embodiment.

FIG. 17 is a flow chart illustrating a method 1700 of supporting multiple channel sizes for optical wavelength channels in an illustrative embodiment. The steps of method 1700 in FIG. 17 will be described with reference to optical wavelength multiplexer 100 or optical wavelength multiplexer/demultiplexer 900, but those skilled in the art will appreciate that the method may be performed in other devices. The steps of the flow charts described herein are not all inclusive and may include other steps not shown, and the steps may be performed in an alternative order.

For method 1700, a passive optical filter 110 combines the odd channels 121 of the optical wavelength channels 120 into a first multiplexed optical signal 130 comprising the odd channels 121 (step 1702). It is noted that the first multiplexed optical signal 130 includes the odd channels 121 exclusively, and the even channels 122 do not reside on the first multiplexed optical signal 130. A passive optical filter 111 combines the even channels 122 of the optical wavelength channels 120 into a second multiplexed optical signal 131 comprising the even channels 122 (step 1704). It is noted that the second multiplexed optical signal 131 includes the even channels 122 exclusively, and the odd channels 121 do not reside on the second multiplexed optical signal 131. Optical combiner 104 combines the odd channels 121 of the first multiplexed optical signal 130 and the even channels 122 of the second multiplexed optical signal 131 into a composite optical signal 132 (step 1706).

As discussed above, a first channel size is defined for the optical wavelength channels 120 due to a partial overlap between the odd channels 121 and the even channels 122 in the composite optical signal 132. To support multiple channel sizes, a larger channel size may be provisioned for a target channel 302. Optical attenuators 114 operate to substantially block one or more adjacent channels 304 adjacent to a target channel 302 provisioned with a width larger than a width of the adjacent channels 304 (step 1708). For example, optical attenuators 114 of the adjacent channels 304 may be activated or adjusted to block optical signals of the adjacent channels 304, and reduce the power level of the optical signals to substantially zero (if existing). With optical signals of the adjacent channels 304 blocked or canceled, the channel size 322 of the target channel 302 may be increased without interference. One technical benefit is a different channel size may be provisioned per optical wavelength channel 120. Step 1708 may be repeated for multiple target channels 302 as desired.

Figure 18:
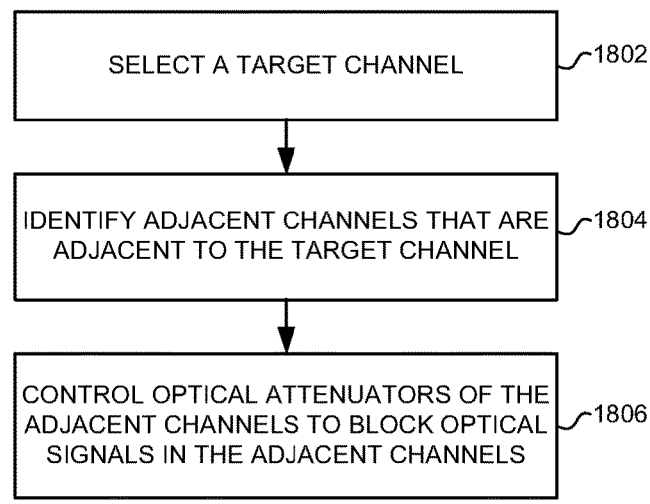
FIG. 18 is a flow chart illustrating a method of provisioning a larger channel size for a target channel in an illustrative embodiment.

FIG. 18 is a flow chart illustrating a method 1800 of provisioning a larger channel size for a target channel in an illustrative embodiment. The steps of method 1800 in FIG. 18 will be described with reference to a controller 134, but those skilled in the art will appreciate that the method may be performed in other devices.

For method 1800, controller 134 is configured to enable optical wavelength multiplexer 100 or optical wavelength multiplexer/demultiplexer 900 to selectively combine light from optical wavelength channels 120 of different channel sizes or channel widths. For example, controller 134 is configured to operate optical attenuators 114 to substantially block one or more adjacent channels 304 adjacent to target channel 302 provisioned to optical wavelength multiplexer 100 or optical wavelength multiplexer/demultiplexer 900 in response to a channel width for the target channel 302 being larger than a channel width of the adjacent channels 304. Thus, controller 134 selects or identifies a target channel 302 (step 1802) for a larger channel size (i.e., larger channel size than the dense channel size defined by a partial overlap between the odd channels 121 and the even channels 122 in the composite optical signal 132). For example, controller 134 may receive input (e.g., from a user, a channel allocator, etc.) provisioning an optical wavelength channel 120 (or corresponding channel input port) for a larger channel size. Controller 134 identifies adjacent channels 304 that are adjacent to the target channel 302 (step 1804). Controller 134 then controls the optical attenuators 114 of the adjacent channels 304 to substantially block optical signals in the adjacent channels 304 (step 1806). For example, controller 134 may set the optical attenuators 114 of the adjacent channels 304 to an optical attenuation of greater than 25 dB. Controller 134 may repeat method 1800 for multiple target channels 302 as desired.

Figure 19:
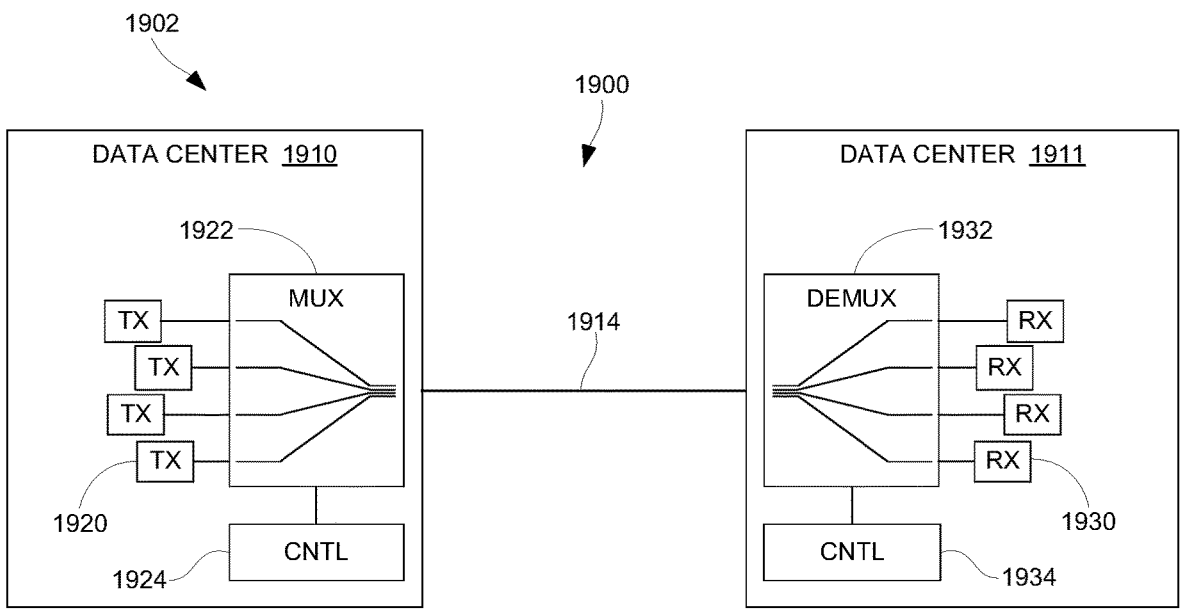
FIG. 19 is a block diagram of a WDM fiber optic communication system in an illustrative embodiment.

One implementation of an optical wavelength multiplexer 100 or an optical wavelength multiplexer/demultiplexer 900 as discussed above is in a Data Center Interconnect (DCI) network. FIG. 19 is a block diagram of a WDM fiber optic communication system 1900 in an illustrative embodiment. WDM fiber optic communication system 1900 may be implemented in a DCI network 1902, where two (or more) data centers (e.g., data center 1910 and data center 1911) are interconnected by an optical network. Data centers 1910 and 1911 are connected by one or optical fibers 1914. The bandwidth between data centers 1910 and 1911 may be 200G, 400G, 800G, or a higher capacity depending on desired implementations. DCI network 1902 may operate over metro, regional, or long-haul (LH) distances.

Data center 1910 includes DWDM-based DCI transport appliances, such as optical transmitters (TX) 1920 (e.g., optical transponders, optical muxponders, routers, etc.), one or more optical multiplexer devices 1922, and a controller 1924. An optical multiplexer device 1922 may comprise an optical wavelength multiplexer 100 or an optical wavelength multiplexer/demultiplexer 900 as described above. Optical multiplexer device 1922 includes a plurality of optical channel input ports with different WDM wavelengths (i.e., different WDM channels), and optical transmitters 1920 are configured to send data over optical carrier signals substantially centered on their respective WDM wavelengths. Optical multiplexer device 1922 is configured to combine the optical carrier signals at different WDM wavelengths into a composite optical signal that is output over optical fiber 1914 via an output line port. Controller 1924 is configured to control operations of optical multiplexer device 1922. Although shown as external from optical multiplexer device 1922, controller 1924 may be implemented on-board on a common platform as optical multiplexer device 1922.

Data center 1911 also includes DWDM-based DCI transport appliances, such as optical receivers (RX) 1930, one or more optical demultiplexer devices 1932, and a controller 1934. An optical demultiplexer device 1932 may comprise an optical wavelength multiplexer/demultiplexer 900 as described above. Optical demultiplexer device 1932 receives the composite optical signal over the optical fiber 1914 via an input line port, and splits the composite optical signal into the individual optical carrier signals at the different WDM wavelengths. Optical demultiplexer device 1932 includes a plurality of optical channel output ports mapped to the different WDM wavelengths, and optical receivers 1930 are configured to receive data over the optical carrier signals on the WDM channels.

Data center 1910 may implement optical transmitters 1920 that operate with a first channel size based on baud rate, modulation format, etc. For example, one or more optical transmitters 1920 may comprise 400ZR coherent optics modules that operate at a channel size of about 75 GHz. It may be beneficial to migrate at least some of the optical transmitters 1920 to higher capacity modules, such as 800ZR coherent optics modules that operate with a larger channel size of about 150 GHz.

Optical multiplexer device 1922 is a flexible multiplexer that supports multiple channel sizes on a per-wavelength basis or per-port basis to meet each optical transmitter operation mode, such as a first channel size 222 and a larger, second channels size 322 as shown in FIG. 3. For example, optical multiplexer device 1922 may support channel sizes of about 75 GHz and 150 GHz, although other channel sizes are considered herein, such as 100 GHz/200 GHz, 150 GHz/300 GHz, etc. Thus, data center 1910 may implement one or more optical transmitters 1920 configured for the first channel size 222, and may implement one or more optical transmitters 1920 configured for the larger, second channel size 322. To accommodate the larger channel size, controller 1924 is configured to interact with optical multiplexer device 1922 to adjust channel size of one or more WDM channels.

One technical benefit of using a flexible multiplexer as described herein is a simple, low-cost device can support future network upgrades to a DCI network 1902 or a WDM network in general. This enables a network operator to deploy the current generation of coherent optics technology and next generation of wavelength speeds, eliminating the need to overbuild a WDM network as next generation transponder technology is developed. For example, a DCI network 1902 may use 400G wavelengths for some applications, and can upgrade to 800G wavelengths using flexible multiplexers as described above.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

Although specific embodiments were described herein, the scope of the disclosure is not limited to those specific embodiments. The scope of the disclosure is defined by the following claims and any equivalents thereof.

What is claimed is:

1. An apparatus, comprising:
an optical wavelength multiplexer to multiplex a sequence of optical wavelength channels, the optical wavelength multiplexer comprising:
  a first passive optical filter configured to combine odd channels of the sequence of optical wavelength channels into a first multiplexed optical signal;
  a second passive optical filter configured to combine even channels of the sequence of optical wavelength channels into a second multiplexed optical signal;
  an optical combiner configured to combine the odd channels and the even channels into a composite optical signal;
  a plurality of variable optical attenuators implemented on the optical wavelength channels between the first and second passive optical filters and optical inputs of the optical wavelength multiplexer; and
  an electronic controller configured to operate the variable optical attenuators to substantially block one or more adjacent optical wavelength channels adjacent to a particular optical wavelength channel provisioned to the optical wavelength multiplexer in response to a width for the particular optical wavelength channel being larger than a width of the one or more adjacent optical wavelength channels.

2. The apparatus of claim 1, wherein:
the first passive optical filter comprises a first arrayed waveguide grating filter; and
the second passive optical filter comprises a second arrayed waveguide grating filter.

3. The apparatus of claim 1, wherein the optical wavelength multiplexer further comprises:
photodetectors, each of the photodetectors being configured to measure light at a corresponding one of the optical inputs of the optical wavelength multiplexer.

4. The apparatus of claim 1, wherein:
the electronic controller is configured to enable the optical wavelength multiplexer to selectively combine light from the optical wavelength channels of different widths.

5. The apparatus of claim 1, wherein:
the optical wavelength multiplexer comprises a plurality of optical channel input ports each associated with a specific optical wavelength channel; and
the variable optical attenuators are each implemented between one of the optical channel input ports and one of the first and second passive optical filters.

6. The apparatus of claim 1, wherein:
the electronic controller is configured to set each of the variable optical attenuators at the one or more adjacent optical wavelength channels to an optical attenuation of greater than 25 dB to substantially block the one or more adjacent optical wavelength channels.

7. The apparatus of claim 1, wherein:
the particular optical wavelength channel has a width of 150 GHz, and at least one of the one or more adjacent optical wavelength channels has a width of 75 GHz.

8. The apparatus of claim 1, wherein:
the optical wavelength multiplexer is implemented in a Data Center Interconnect (DCI) network.

9. An apparatus comprising:
an optical wavelength multiplexer/demultiplexer configured to operate on a sequence of optical Wavelength Division Multiplexing (WDM) channels, the optical wavelength multiplexer/demultiplexer comprising:
  a first passive optical filter configured to combine odd channels of the sequence into a first multiplexed optical signal;
  a second passive optical filter configured to combine even channels of the sequence into a second multiplexed optical signal;
  an optical combiner configured to combine the odd channels of the first multiplexed optical signal and the even channels of the second multiplexed optical signal into a composite optical signal;
  variable optical attenuators implemented on the optical WDM channels between the first and second passive optical filters and optical inputs of the optical wavelength multiplexer/demultiplexer; and
  an electronic controller configured to, for a selected one of the optical WDM channels, operate the variable optical attenuators of adjacent one or more of the optical WDM channels to substantially block optical signals therein in response to a width of the selected one of the optical WDM channels being larger than a width of the one or more adjacent optical WDM channels.

10. The apparatus of claim 9 wherein:
the first passive optical filter and the second passive optical filter comprise arrayed waveguide grating filters.

11. The apparatus of claim 9, wherein the optical wavelength multiplexer/demultiplexer further comprises:
a plurality of photodetectors, each of the photodetectors being connected to transmit a measurement of an intensity of a corresponding one of the optical WDM channels to the electronic controller.

12. The apparatus of claim 9, wherein:
the electronic controller is configured to selectively operate the variable optical attenuators to reduce overlaps of the optical WDM channels in response to some of the optical WDM channels having larger widths than others of the optical WDM channels.

13. The apparatus of claim 9, wherein the optical wavelength multiplexer/demultiplexer further comprises:
an optical splitter configured to split another composite optical signal;
a third passive optical filter configured to separate the other composite optical signal into the odd channels; and
a fourth passive optical filter configured to separate the other composite optical signal into the even channels.

14. The apparatus of claim 13, wherein:
the optical wavelength multiplexer/demultiplexer is implemented on a consolidated platform comprising the first passive optical filter, the second passive optical filter, the optical combiner, the variable optical attenuators, the third passive optical filter, the fourth passive optical filter, and the optical splitter housed in an enclosure.

15. The apparatus of claim 13, wherein:
the optical wavelength multiplexer/demultiplexer is implemented on a modular platform comprising:
an optical wavelength multiplexer/demultiplexer module comprising the first passive optical filter, the second passive optical filter, the optical combiner, the third passive optical filter, the fourth passive optical filter, and the optical splitter; and
a variable optical attenuator array module comprising an array of the variable optical attenuators.

16. The apparatus of claim 13, wherein:
the optical wavelength multiplexer/demultiplexer is implemented on a modular platform comprising:
a first optical wavelength multiplexer/demultiplexer module comprising the first passive optical filter, the third passive optical filter, the optical combiner, and the optical splitter;
a second optical wavelength multiplexer/demultiplexer module comprising the second passive optical filter and the fourth passive optical filter;
a first variable optical attenuator array module comprising a first array of the variable optical attenuators for the odd channels; and
a second variable optical attenuator array module comprising a second array of the variable optical attenuators for the even channels.

17. The apparatus of claim 9, wherein:
the electronic controller is configured to set each of the variable optical attenuators of the one or more adjacent optical WDM channels to an optical attenuation of at least 25 dB to substantially block the optical signals in the one or more adjacent optical WDM channels.

18. The apparatus of claim 9, wherein:
the optical wavelength multiplexer/demultiplexer is implemented in a Data Center Interconnect (DCI) network.

19. A method of supporting multiple channel sizes for optical wavelength channels of an optical wavelength multiplexer, the method comprising:
combining, at a first passive optical filter, odd channels of the optical wavelength channels into a first multiplexed optical signal;
combining, at a second passive optical filter, even channels of the optical wavelength channels into a second multiplexed optical signal;
combining, at an optical combiner, the odd channels of the first multiplexed optical signal and the even channels of the second multiplexed optical signal into a composite optical signal; and
controlling, via an electronic controller, variable optical attenuators implemented on the optical wavelength channels between the first and second passive optical filters and optical inputs of the optical wavelength multiplexer, wherein the controlling comprises controlling the variable optical attenuators to substantially block one or more adjacent optical wavelength channels adjacent to a particular optical wavelength channel provisioned with a width larger than a width of the one or more adjacent optical wavelength channels.

20. The method of claim 19, wherein the controlling the variable optical attenuators comprises:
setting each of the variable optical attenuators of the one or more adjacent optical wavelength channels to an optical attenuation of greater than 25 dB to substantially block the one or more adjacent optical wavelength channels.

* * * * *